(12) United States Patent
Kuntz

(10) Patent No.: US 11,155,350 B2
(45) Date of Patent: Oct. 26, 2021

(54) PERSONAL FLIGHT VEHICLE HAVING A HELIUM BACKPACK

(71) Applicant: Carl Kuntz, Waterloo (CA)

(72) Inventor: Carl Kuntz, Waterloo (CA)

(73) Assignee: Carl Kuntz, Waterloo (CA)

( * ) Notice: Subject to any disclaimer, the term of this patent is extended or adjusted under 35 U.S.C. 154(b) by 122 days.

(21) Appl. No.: 16/706,060

(22) Filed: Dec. 6, 2019

(65) Prior Publication Data

US 2021/0053682 A1 Feb. 25, 2021

Related U.S. Application Data

(60) Provisional application No. 62/889,235, filed on Aug. 20, 2019.

(51) Int. Cl.
*B64C 39/02* (2006.01)
*B64B 1/62* (2006.01)
*B64B 1/64* (2006.01)

(52) U.S. Cl.
CPC .............. *B64C 39/026* (2013.01); *B64B 1/62* (2013.01); *B64B 1/64* (2013.01)

(58) Field of Classification Search
CPC ..... B64C 39/026; B64C 31/02; B64C 31/028; B64C 31/04; B64B 1/20; B64B 1/62; B64B 1/64
See application file for complete search history.

(56) References Cited

U.S. PATENT DOCUMENTS

| | | | |
|---|---|---|---|
| 1,640,270 A | 8/1927 | Furman | |
| 4,424,945 A * | 1/1984 | Dell | B64C 31/036 244/13 |
| 5,425,515 A * | 6/1995 | Hirose | B64B 1/20 244/25 |
| 6,182,924 B1 * | 2/2001 | Nott | B64B 1/44 244/61 |
| 6,688,553 B2 | 2/2004 | Hsia | |
| 8,104,718 B2 | 1/2012 | Shaw | |

(Continued)

FOREIGN PATENT DOCUMENTS

| | | |
|---|---|---|
| WO | 2017136906 A1 | 8/2017 |
| WO | WO-2017136906 A1 * | 8/2017 ............. B64D 17/00 |

OTHER PUBLICATIONS

English machine translation of WO2017136906A1, published on Aug. 17, 2017.

(Continued)

*Primary Examiner* — Philip J Bonzell
*Assistant Examiner* — Tye William Abell
(74) *Attorney, Agent, or Firm* — Bereskin & Parr LLP

(57) ABSTRACT

A flight vehicle including a frame having a bottom side configured to receive a user harness, port and starboard wings extend from port and starboard sides of the frame. Each wing may include at least one helium wing bag. The flight vehicle also includes a helium backpack secured to a top side of the frame, the helium backpack including an inflatable main helium bag configured for holding a main volume of helium. Each of the at least one helium wing bag may be fluidically isolated from the main helium bag. The flight vehicle may include a rigid base member, the inflatable main helium bag joined to an upper surface of the rigid base member via an elastic expansion member.

26 Claims, 11 Drawing Sheets

(56) References Cited

U.S. PATENT DOCUMENTS

| | | | | |
|---|---|---|---|---|
| 8,366,052 | B1 | 2/2013 | Lutke et al. | |
| 2002/0084386 | A1* | 7/2002 | Hsia | B64C 31/04 244/123.11 |
| 2002/0134890 | A1* | 9/2002 | Berzin | B64C 31/036 244/142 |
| 2004/0084565 | A1* | 5/2004 | Albrecht | B64C 1/00 244/5 |
| 2008/0087762 | A1* | 4/2008 | Holloman | B64B 1/12 244/30 |
| 2009/0049757 | A1* | 2/2009 | Potter | B63B 32/51 52/2.23 |
| 2010/0270424 | A1* | 10/2010 | DeLaurier | B64B 1/06 244/25 |
| 2011/0198437 | A1* | 8/2011 | Brandon | B64B 1/40 244/25 |
| 2013/0161451 | A1 | 6/2013 | Contoret | |
| 2015/0210389 | A1* | 7/2015 | Murdock | B64C 33/00 244/22 |
| 2020/0262536 | A1* | 8/2020 | Deakin | B64B 1/38 |

OTHER PUBLICATIONS

Schmoekel, Nathan. Idea: Helium filled wing or fuselage?. In RC Groups (Aircraft—Electric—Airplanes;Electric Plane Talk Forum) [online]. RCGroups.com Feb. 24, 2009; 05:55 CST [retrieved on Jul. 4, 2019]. Retrieved from <https://www.rcgroups.com/forums/showthread.php?1007049-Helium-filled-wing-or-fuselage> (7 pages).

Inflatable Tank. Image [online]. www.psywarrior.com [retrieved on Jun. 4, 2020]. Retrieved from < http://www.psywarrior.com/InflatableTank.jpg> (1 page).

Drop-stitch IKs: Razorlite, KXone, Yakkair, etc. [online] [multimedia]. Inflatable Kayaks & Packrafts, updated summer 2020. [retrieved on Jun. 5, 2020]. Retrieved from <https://inflatablekayaksandpackrafts.com/2015/05/27/sea-eagles-10psi-drop-stitch-473rl-razorlite-kayak/> (16 pages).

Inflatoplane, Image [online], www.apaddleinmypack.files.wordpress.com [retrieved on Jun. 5, 2020]. Retrieved from < https://apaddleinmypack.files.wordpress.com/2013/08/inflatoe.jpg> (1 page).

Wikipedia, Goodyear Inflatoplane, Last modified Apr. 14, 2020, [retrieved on Jun. 5, 2020]. Retrieved from < https://en.wikipedia.org/wiki/Goodyear_Inflatoplane> (3 pages).

* cited by examiner

PERSONAL FLIGHT VEHICLE HAVING A HELIUM BACKPACK

TECHNICAL FIELD

This disclosure relates to flight apparatus, and more particularly, to personal flight vehicles.

BACKGROUND

There has long been an interest in creating personal flight apparatus.

Various attempts have been made to create such an apparatus. According to Greek mythology, one of the early known flight apparatus was created by Daedalus, which utilized a pair of wings made from feathers and wax. However, this flight apparatus had certain limitations, and according to the legend, Daedalus instructed his son, Icarus, not to fly too low, where the dampness of the sea would clog his wings, or too high, where the sun would melt the wax. Unfortunately, Icarus flew too close to the sun, and fell from the sky into the sea.

Other, more recent attempts at creating the perfect personal flight apparatus include personal jet packs that can be strapped to the back of a person, small propeller driven motorized aircraft, and helicopter like vehicles. Still other attempts include lighter than air vehicles such as balloons and dirigibles. However, all of these prior art flight vehicles have certain limitations and/or disadvantages, and so far no one personal flight vehicle has been universally accepted.

There is accordingly a need for an improved personal flight vehicle, which does not suffer from at least some of the limitations or disadvantages of known flight vehicles.

SUMMARY

In a first aspect, some embodiments of the invention provide a flight vehicle, comprising a frame, the frame having a bottom side configured to receive a user harness; a port wing extending from a port side of the frame and a starboard wing extending from a starboard side of the frame, each wing comprising at least one helium wing bag for containing a wing volume of helium and having a wing port for the passage of fluid in and out of the wing bag; a helium backpack secured to a top side of the frame, the helium backpack comprising an inflatable main helium bag configured for holding a main volume of helium, the main helium bag having a main bag port for the passage of fluid in and out of the main helium bag; at least one pressurized container secured to the frame, the at least one pressurized container being configured to contain liquid helium, and having a container opening for the passage of fluid in and out of the pressurized container; at least one electronic valve coupled to the at least one pressurized container for governing fluid flow through the container opening; and a system of hoses configured to carry a flow of helium, the system of hoses connecting the at least one electronic valve to the main bag port and to the wing ports.

In some embodiment, the helium backpack comprises a rigid base member secured to the top side of the frame, wherein the inflatable main helium bag is joined to an upper surface of the rigid base member.

Each wing may include an outer skin supported by a plurality of ribs, and the at least one helium wing bag comprises a plurality of helium wing bags interspaced between the ribs.

Each wing may include an inflatable outer skin formed with a drop stitch construction, the inflatable outer skin forming the at least one helium wing bag.

Each wing may include at least one inflatable edge extension having at least one support.

The at least one inflatable edge extension may include at least one of a leading edge extension and a trailing edge extension.

The at least one support may be an internal support and may extend between a first wall of the edge extension and a second wall of the edge extension to push apart the first and second walls of the edge extension.

The at least one support may be a flexible post or a compression spring.

The at least one electronic valve may have an operating position selected from a plurality of operational positions, the plurality of operational positions including a closed position, an inflation open position to supply an inflation flow of helium gas to the system of hoses from the at least one pressurized container, and a deflation open position to vent a deflation flow of helium gas from the system of hoses to the atmosphere.

The flight vehicle may further comprise at least one pressure sensor to sense a pressure of at least one of the inflatable main helium bag and the helium wing bags, and a control system coupled to the at least one pressure sensor to receive the sensed pressure measurement, the control system coupled to the at least one electronic valve to set the operating position of the at last one electronic valve, the control system configured to set the operating position by comparing the sensed pressure measurement to a predetermined pressure measurement.

The at least one electronic valve may allow a main helium pressure of the main helium bag to be controlled separately from a wing helium pressure of the helium wing bags.

The port wing may be joined to the frame by a port joint and the starboard wing joined to the frame by a starboard joint, and wherein the frame has a vertical axis and each of the port and starboard joints bias the wing in a flight position and limit downward vertical movement.

The port and starboard joints may be ball joints.

The rigid base member may be a planar base member.

The upper surface of the rigid base member may be convex.

The rigid base member may have an aerodynamically-shaped front face forming a leading edge.

The inflatable main helium bag may have a longitudinal axis, a vertical axis orthogonal to the longitudinal axis, and a transverse axis orthogonal to both the longitudinal and the vertical axis, the rigid base member having a length parallel to the longitudinal axis, a height parallel to the vertical axis, and a width parallel to the transverse axis, the height smaller than the width and the width smaller than the length.

The flight vehicle may further comprise a release valve to vent at least one of the at least one helium wing bag of the port wing, the at least one helium wing bag of the starboard wing, and the inflatable main helium bag.

The release valve may open in response to at least one of a threshold internal pressure, a threshold flight vehicle altitude, a threshold elapsed time, and a manual user action.

In a second aspect, some embodiments of the invention provide a helium backpack for a flight vehicle, comprising an inflatable main helium bag for receiving a main volume of helium, a rigid base member, wherein the inflatable main helium bag is joined to an upper surface of the rigid base member along a perimeter of the elastic expansion member, the inflatable main helium bag and the rigid base member having a main bag opening through from a lower surface of the rigid base member to an interior of the main helium bag for the passage of fluid in and out of the interior; wherein the rigid base member is securable to the flight vehicle, the flight vehicle having a port wing and a starboard wing; and at least one pressurized container secured to the rigid base member, each of the at least one pressurized container being configured to contain liquid helium and joined to the main bag opening through a valve to provide a controlled supply of helium to control the inflation level of the main helium bag.

In some embodiments, each wing of the set of wings may be a rigid wing which includes at least one helium wing bag shaped to hold a wing volume of helium.

The helium backpack may further comprise a user harness secured to the rigid base member for holding a pilot user to the flight vehicle.

The rigid base member may be a planar base member.

The upper surface of the rigid base member may be convex.

The rigid base member may have an aerodynamically-shaped front face forming a leading edge.

The inflatable main helium bag may have a longitudinal axis, a vertical axis orthogonal to the longitudinal axis, and a transverse axis orthogonal to both the longitudinal and the vertical axis, the rigid base member having a length parallel to the longitudinal axis, a height parallel to the vertical axis, and a width parallel to the transverse axis, the height smaller than the width and the width smaller than the length.

BRIEF DESCRIPTION OF THE DRAWINGS

The drawings included herewith are for illustrating various examples of systems, methods, and apparatus of the present specification. In the drawings.

DETAILED DESCRIPTION

Various systems, methods and apparatus will be described below to provide an example of each claimed embodiment. No embodiment described below limits any claimed embodiment and any claimed embodiment may cover systems, methods and/or apparatus that differ from those described below. The claimed embodiments are not limited to systems, methods and apparatus having all of the features of any one system, method and apparatus described below or to features common to multiple or all.

Figure 1:
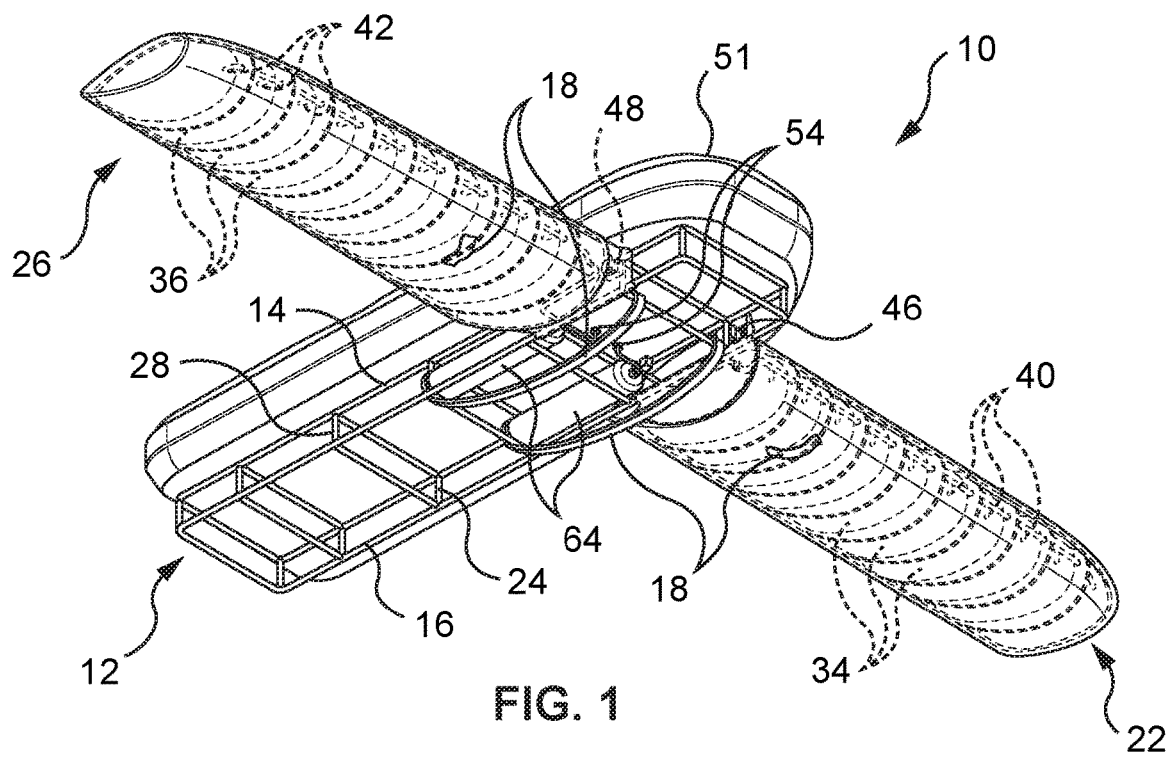
FIG. 1 is a bottom front perspective view of a personal flight vehicle according to a first embodiment, deflated.

Referring to FIG. 1, an exemplary personal flight vehicle 10 includes a frame 12, having a top side 14 and a bottom side 16. Bottom side 16 is configured to receive a user harness. A user harness is secured to the bottom side 16 of the illustrated example. In the exemplary embodiment, the user harness comprises a system of straps 18 to hold flight vehicle 10 to a pilot user. In some embodiments, a user harness is an aeronautic 5-point harness. In some embodiments, a position of a harness is moveable to accommodate shorter or taller pilots.

Flight vehicle 10 also includes a set of wings. In the illustrated example the set of wings includes a port wing 22 extending from a port side 24 of frame 12 and a starboard wing 26 extending from a starboard side 28 of frame 12. Each wing includes at least one helium wing bag to hold a wing volume of helium. Port wing 22 includes a plurality of port bags 34 and starboard wing 26 includes a plurality of starboard bags 36. Each of the plurality of port bags 34 includes a port bag opening 40 for the passage of fluid in and out, and each of the plurality of starboard bags 36 includes a starboard bag opening 42 for the passage of fluid in and out. Wings 22, 26 may be rigid glider type wings, light weight and internally strengthened with ribs and/or spars.

In the illustrated embodiment, port joint 46 joins port wing 22 and frame 12 together and starboard joint 48 joins starboard wing 26 and frame 12 together. Port and starboard joints 46, 48 are ball joints allowing rotary motion of port and starboard wings 22, 26. However, in other embodiments wings may be joined to a frame without a joint between, such as by being rigidly secured directly to the frame. In the illustrated example, each of joints 46, 48 is covered by a flexible membrane, such as a smooth flexible rubber or plastic that will stretch when the wing is rotated rearward.

A helium backpack 51 is secured to a top side 14 of frame 12. Helium backpack 51 comprises main helium bag 52 having a main bag opening 54 for the passage of fluid in and out of the main helium bag 52.

Figure 2:
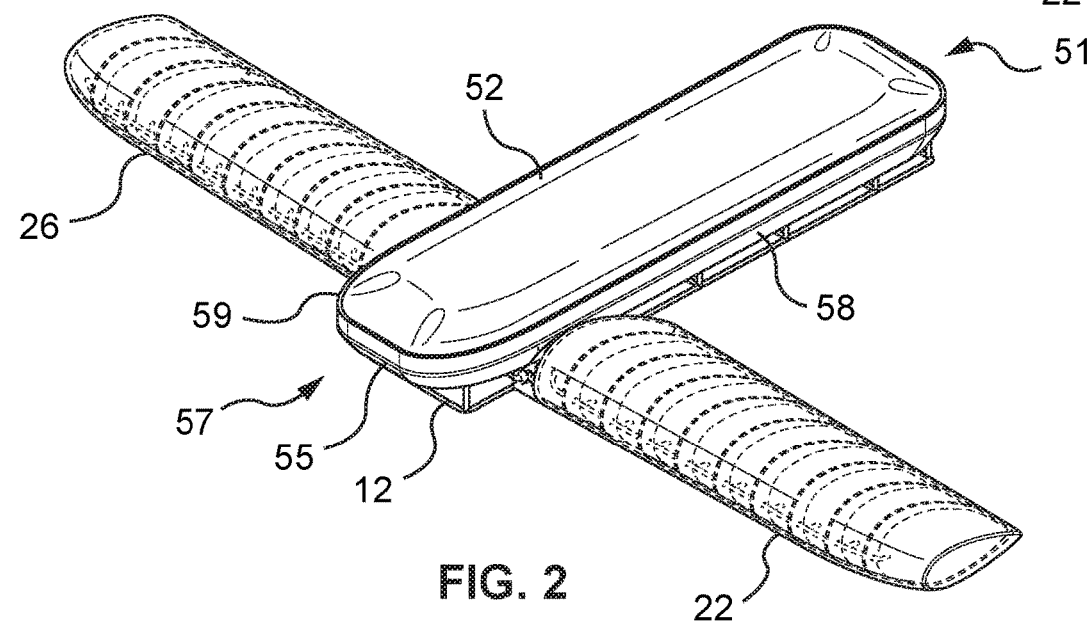
FIG. 2 is a top front perspective view of the inflatable flight vehicle of FIG. 1, deflated.
Figure 3:
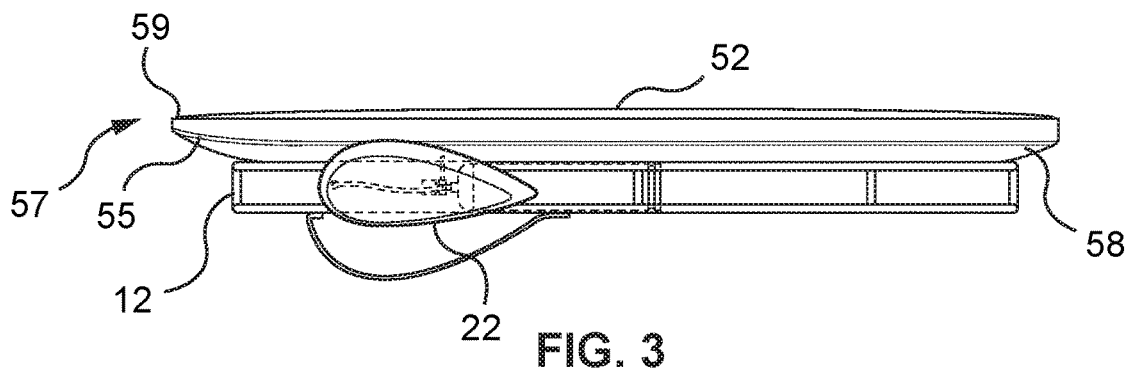
FIG. 3 is a left side elevation view of the inflatable flight vehicle of FIG. 1, deflated.

Referring to FIGS. 2 and 3, in the illustrated embodiment, helium backpack 51 also comprises rigid base member 58 which is secured to the top side of the frame 12. Rigid base member 58 may be made of a plastic or light-weight composite, and main helium bag 52 may be made of an elastic fabric, rubber, or flexible plastic. In the illustrated example, the main helium bag 52 is joined to a top surface 59 of the rigid base member 58. As illustrated, main bag opening 54 is a pair of port and starboard openings extending through rigid base member 58 and into an interior of main helium bag 52.

In some embodiments, a main helium bag may be formed by an elastic expansion member joined to a top surface of a rigid bas member along a perimeter of the elastic expansion member. The elastic expansion member stretched between the perimeter of the elastic expansion member and configured to expand away from the rigid base member when the main helium bag is inflated. In some embodiments, a main helium bag may be held to a rigid base by an elastic expansion member.

In the illustrated embodiment, rigid base member 58 is a planar base member having a slightly convex upper surface 59 and an aerodynamically-shaped front face 57 forming a leading edge 55. An aerodynamically-shaped front face 57 may permit easier gliding flight when main helium bag 52 is deflated as shown in FIG. 3, and may also be shaped to provide a lifting force in some embodiments.

In the illustrated embodiment, frame 12 is a relatively large structure, similar in size to rigid base member 58 and is separate from rigid base member 58 to allow rigid base member 58 to be removably attached. However, in some embodiments a frame may be a small structure shaped only to hold at least one pressurized container and to provide support for a set of wings. In some embodiments, the frame may be integrated with a rigid base member rather than being separable.

Referring again to FIG. 1, flight vehicle 10 includes a pair of pressurized containers 64 secured to the frame. Pressurized containers 64 may be vacuum or dewar flasks containing liquid helium.

Figure 4:
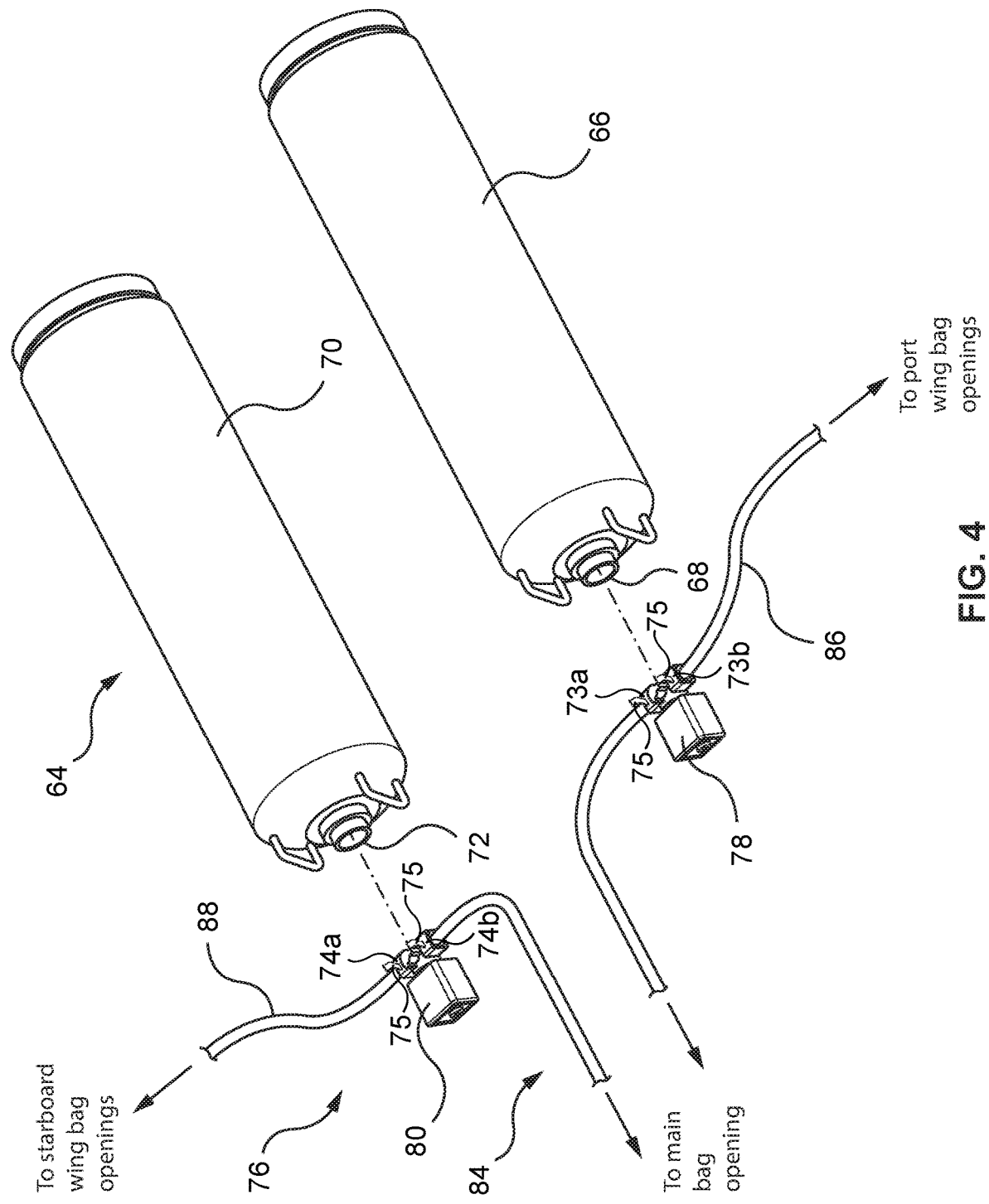
FIG. 4 is an expanded view of a detail of the inflatable flight vehicle of FIG. 1.

Referring to FIG. 4, the pair of pressurized containers 64 are each configured to contain liquid helium and each include an opening for the passage of fluid in and out of the pressurized container. In the illustrated example, the pair of pressurized containers 64 includes a port container 66 having a port container opening 68 and a starboard container 70 having a starboard container opening 72.

The flight vehicle 10 also includes at least one electronic valve 76. In the illustrated example the at least one electronic valve 76 includes a port valve 78 and a starboard valve 80. The port valve 78 is coupled to port container 66 for governing fluid flow through port container opening 68 while the starboard valve 80 is coupled to starboard container 70 for governing fluid flow through starboard opening 72. In some embodiments, electronic valves 76 are magnetic solenoid valves. Electronic valves 78 may be low-voltage valves, and flight vehicle 10 may also include a battery, capacitor, or other power source (not shown) joined to the valves to power the valves 78.

Continuing to refer to FIG. 4, a system of hoses 84 connects the at least one electronic valve 76 to the main bag opening 54 and the port and starboard wing bag openings 40, 42. System of hoses 84 are shaped to carry a flow of helium, and may be insulated thermoplastic or metal hoses for example. In the illustrated example, system of hoses 84 includes a port set of hoses 86 connecting the port container 66 to the main bag opening 54 and the port wing bag openings 40. The system of hoses 84 also includes a starboard set of hoses 88 connecting the starboard container 70 to the main bag opening 54 and the port wing bag openings 42.

In operation, valves 78, 80 may be opened to release liquid helium stored in containers 64. Liquid helium stored in containers 64 may then exit containers 64 and enter system of hoses 84. Between containers 64 and destination gas containers, the helium changes phase and becomes a light gas. As a gas the helium fills the destination gas containers. As the helium gas may be lighter than an environmental atmosphere of the vehicle 10, the helium gas may provide a lifting force to vehicle 10.

In some embodiments a phase change happens upon the liquid exiting containers 64, while in other embodiments the phase change happens at a point in the system of hoses 84 or upon entering a destination gas container.

In some embodiments, a flight vehicle includes venturi valves or other members to assist in changing the phase of the helium. In the embodiment illustrated in FIG. 4, a venturi valve is provided in a helium flow path after each solenoid valve 78, 80. A venturi valve 73a is between solenoid valve 78 and main bag opening 54 and a venturi valve 73b is between solenoid valve 78 and port wing bag openings 40. A venturi valve 74a is between solenoid valve 80 and main bag opening 54 and a venturi valve 74b is between solenoid valve 80 and starboard wing bag openings 42. Venturi valves 73a, 73b, 74a, 74b may assist in changing liquid helium to gas.

In some embodiments, optional heat exchangers are included in a vicinity of an expected phase change to accommodate temperature decreases associated with the phase change. In the illustrated embodiment, a heat exchanger 75 is mounted to each venturi valve 73a, 73b, 74a, 74b and in thermal conductive communication with the valves 73a, 73b, 74a, 74b.

Insulation may also be used to accommodate temperature decreases. In the illustrated example containers 64, solenoid valves 78, 80, venturi valves 73a, 73b, 74a, 74b, and the portions of system of hoses 84 adjacent venturi valves 73a, 73b, 74a, 74b have insulation coatings on exterior surfaces. Insulation coatings may be thermal insulation coatings such as fiberglass or polystyrene foam. In some embodiments, the first several centimeters of hose length extending from each venturi valve 73a, 73b, 74a, 74b may be insulated.

Figure 5:
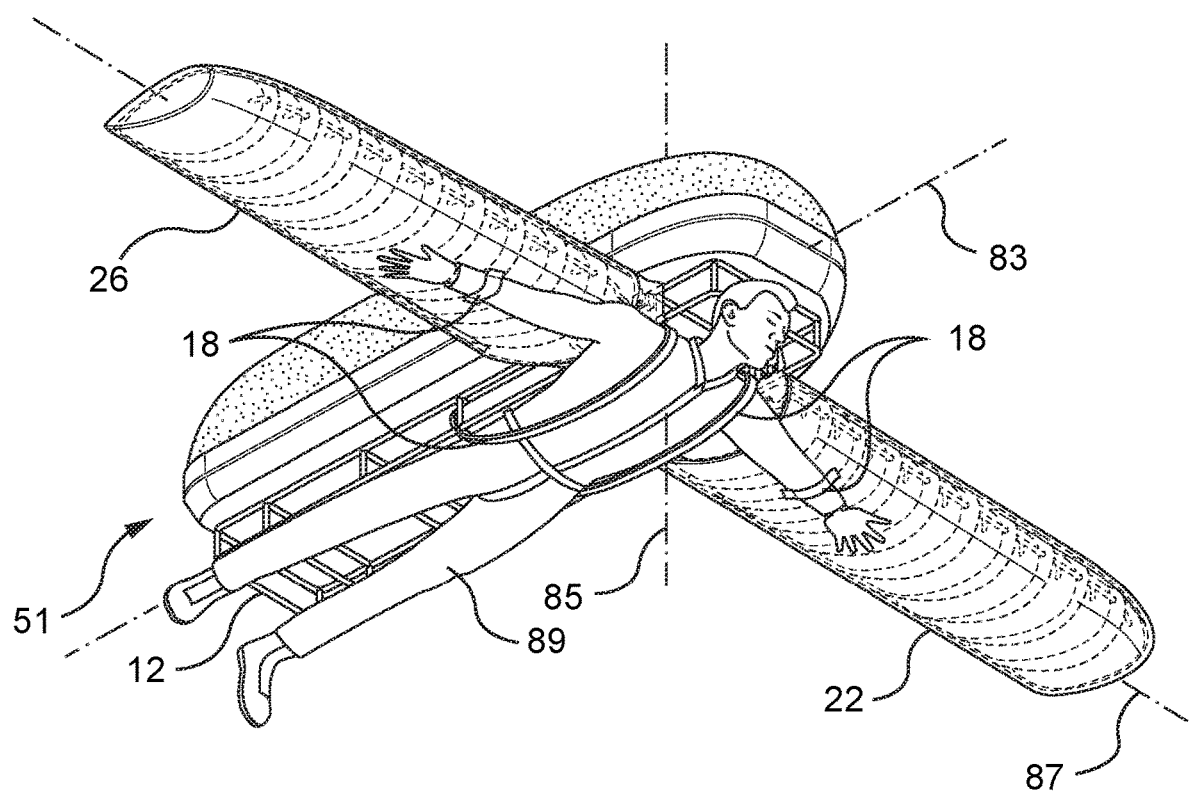
FIG. 5 is a bottom front perspective view of the inflatable flight vehicle of FIG. 1, inflated.

Referring to FIG. 5, flight vehicle 10 defines a longitudinal axis 83, a vertical axis 85 orthogonal to longitudinal axis 83, and a transverse axis 87 orthogonal to both longitudinal axis 83 and vertical axis 85. A pilot user 89 is secured to frame 12 by harness 18, and frame and main helium bag 12, 52 are sized to allow pilot user 89 to stand up when the flight vehicle 10 is attached.

Figure 6:
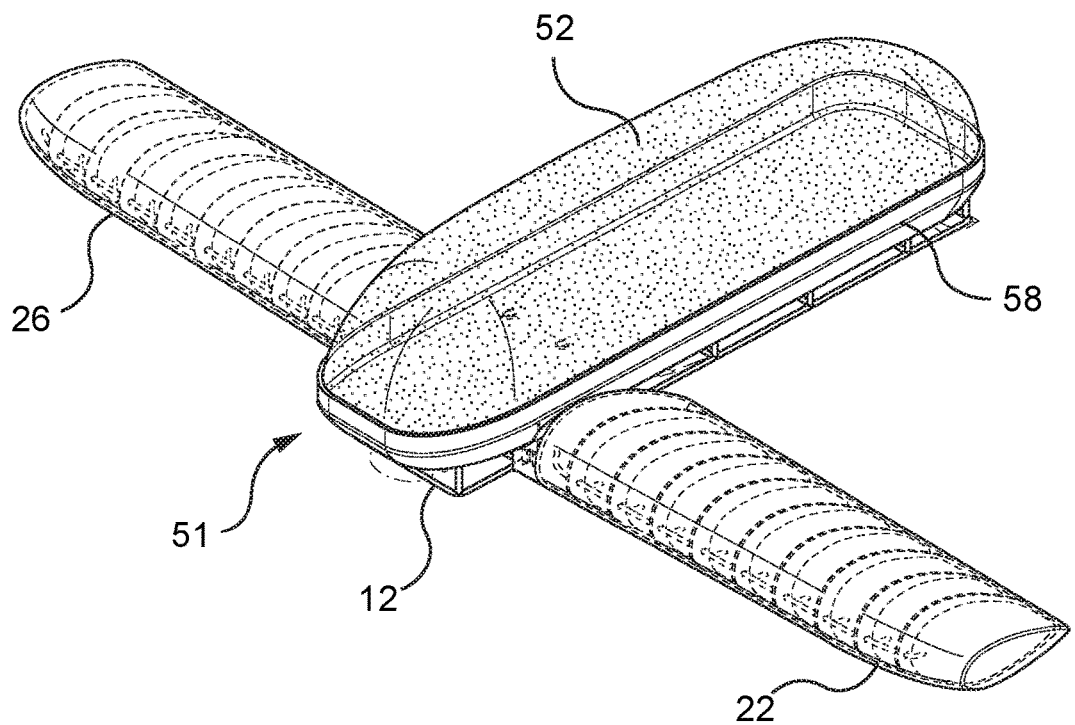
FIG. 6 is a top front perspective view of the inflatable flight vehicle of FIG. 1, inflated.
Figure 7:
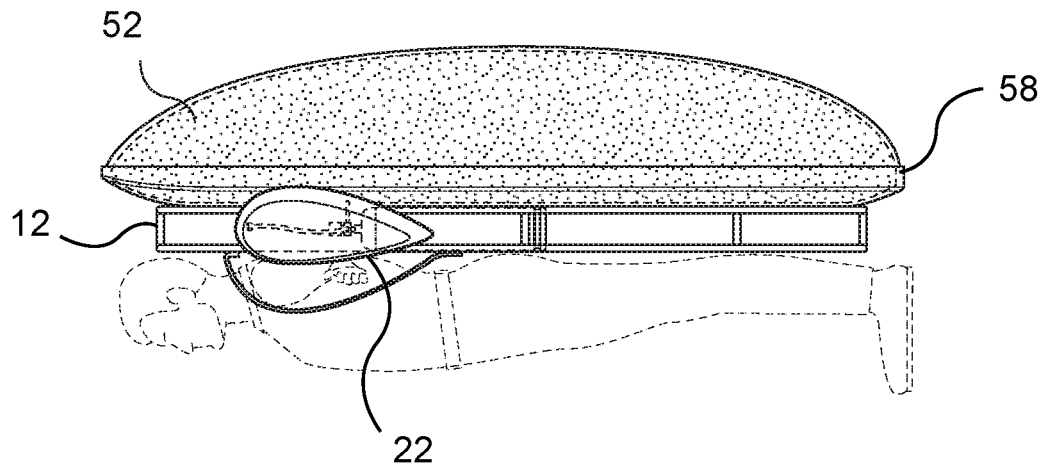
FIG. 7 is a left side elevation view of the inflatable flight vehicle of FIG. 1, inflated.

Referring to FIGS. 5 to 7, main helium bag 52 may be inflated, such as by the release by valves 76 of a flow of helium from containers 64 through hoses 84. In the illustrated example, as main helium bag 52 inflates, elastic expansion member 60 expands away from rigid base member 58 generally along vertical axis 85 to accommodate a main bag volume of helium gas within main helium bag 52.

A flow of helium may be released by valves 76 to main helium bag 52 and to port and starboard wing bags 34, 36 to inflate all helium bags together. Alternatively, valves 76 may release helium gas to only a subset of the helium bags. For example, wing bags 34, 36 may be kept inflated while only main helium bag 52 is inflated and deflated. Deflation of one or more helium bags may also be controlled by valves 76. In some embodiments, a user may select a subset of bags 34 or a subset of bags 36 to control.

Valves 76 may have a number of operational settings. Operational settings may include a closed position, in which a helium flow through hoses 84 both to and from one or more inflatable bag is blocked. Operational settings may also include an inflation open position in which hoses 84 are opened between the pressurized containers 64 and at least one inflatable bag to increase the volume of helium gas in the at least one inflatable bag. Operational settings may also include a deflation open position, in which a passage is opened between at least one inflatable bag and the environment to vent the helium gas from the at least one inflatable bag. For example, venting may result in an improved aerodynamic shape of vehicle 10, or may be used to provide a modified buoyancy of a portion of vehicle 10, such as a port side or a starboard side, as part of maneuvering.

Operational settings may be selected on a bag-by-bag basis. For example, a user may choose to inflate main inflatable bag 52 while leaving port and starboard wing bags 34, 36 at a current inflation level. As another example, a user may choose to inflate port and starboard bags 34, 36 while deflating main inflatable bag 52, such as to maintain a lifting force while deflating expansion member 60 against rigid base member 58 to facilitate gliding flight.

Figure 8:
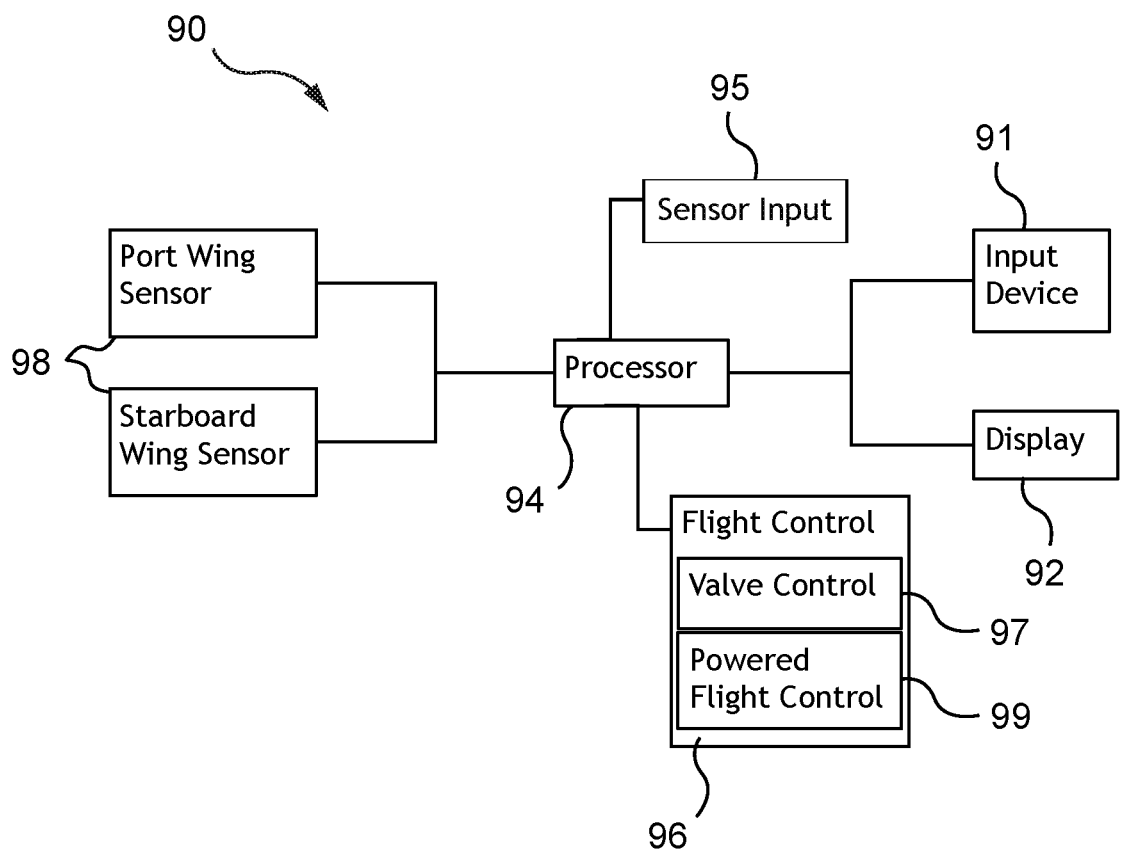
FIG. 8 is a schematic diagram of a control system of the inflatable flight vehicle of FIG. 1.

Referring to FIG. 8, in some embodiments, personal flight vehicle 10 may include a control system 90. Control system 90 receives input from a user through input device 91 and displays information to the user through display 92. A user may access control system 90 remotely, however where a user is a pilot user 89 held to flight vehicle 10 by harness 18 the display 92 may include a display screen mounted on a helmet or adjacent a head of the pilot user 89 while the input device 91 may be a plurality of buttons located on a glove or adjacent a hand of the pilot user 89.

Input device 91 may receive flight directions from a user and transmit the flight directions to a processor 94. A processor 94 may include more than one processor in some embodiments. Processor 94 may provide flight control instructions to a flight control unit 96. Flight control unit 96 includes valve control unit 97 controlling the operational setting of valves 76. In some embodiments, processor 94 may operate in an autonomous control mode, such as described further below.

Figure 9:
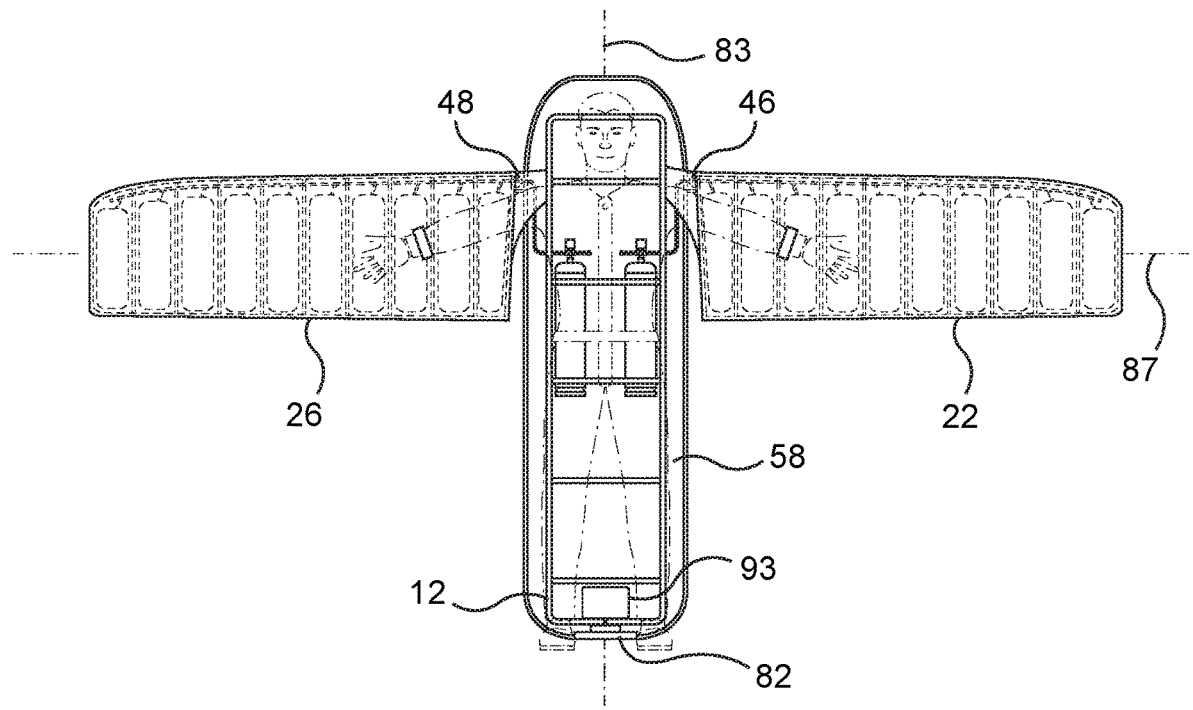
FIG. 9 is a bottom plan view of the inflatable flight vehicle of FIG. 1, including an optional motor and fan unit.

Referring to FIG. 9, in some embodiments flight vehicle 10 is a powered vehicle, and may incorporate an optional motor and fan 82 and a fuel or other power supply 93. The flight control unit 96 may also include a fan or motor control unit and/or rudder control unit or similar powered flight control units 99 (FIG. 8). In some embodiments, a motor and fan unit 82 may be powered by its own power source or a power source of a control system 90 and/or a power source of valves 76, rather than having a separate power source 93. Fan unit 82 of the illustrated example is attached to the rear of the frame 12 for forward or directional motion, and controlled by a user through control system 90 through a wired or wireless connection. Motor and fan unit 82 may be used to provide active lift in some embodiments, may be used for directional control in some embodiments, and may be used for both active lift and directional control in some embodiments.

The illustrated control system 90 also includes pressure sensors 98 to detect and provide sensed pressure measurements. In the illustrated example, pressure sensors 98 include a sensor coupled to the main helium bag 52 to detect a main helium pressure of the main helium bag 52 and a sensor coupled to the port and starboard helium bags 34, 36 to detect a wing helium pressure of the port and starboard helium bags 34, 36. Pressure sensors 98 provide sensed main helium pressure and wing helium pressure results to processor 94. Additional sensor input 95 may also be received by processor 94, such as proximity input or altitude input to assist in automated flying, such as during an autonomous control mode when processor 94 may control or partially control helium pressures and wing positions directly without pilot user input. A storage device (not shown) may also be included.

In some embodiments, a user controls valves 76 by setting a desired pressure measurement of one or more of the helium bags 52, 34, 36. Control system 90 may then select the operating position of valves 76 by comparing the sensed pressure measurement to the predetermined pressure measurement received from the user as a desired pressure measurement and adjusting helium pressures to adjust the sensed pressure measurement to match the predetermined pressure measurement.

A control system 90 may also allow a user to control the pressure of the main helium bag 52 separately from the pressure of the helium wing bags 34, 36. For example the user may choose to inflate all helium bags to lift the flight vehicle 10 into the air, and may then choose to deflate the main helium bag 52 to provide a more aerodynamic shape of flight vehicle 10 for gliding or powered flight while maintaining some lifting force due to the helium in the wings 22, 26. The control system 90 may be powered by the same battery or other power source as valves 76 or may have a separate power source.

In some embodiments, additional sensors or devices may be included in vehicle 10, and may feed information to control system 90. For example, altitude sensors, sonar or radar devices, weight sensors, and clocks may be included. In some embodiments, control system 90 may include a global positioning system and altimeter or other positional sensors, such as to allow autonomous or semi-autonomous flight along a storage path stored on a storage device.

Figure 10:
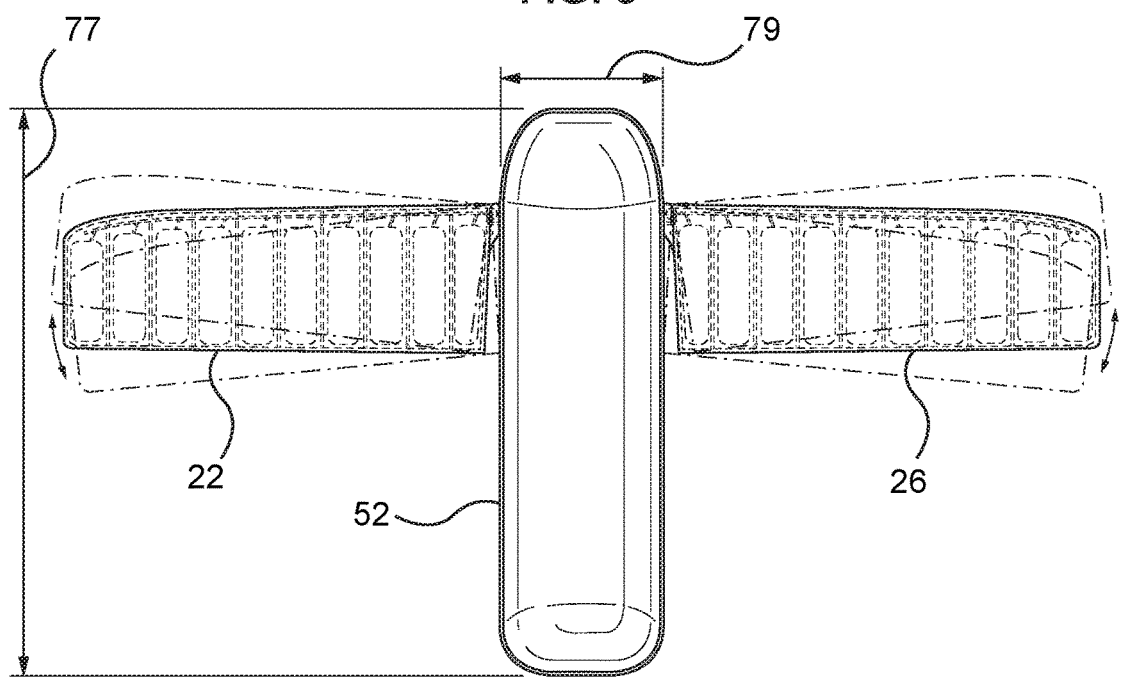
FIG. 10 is a top plan view of the inflatable flight vehicle of FIG. 1, deflated.
Figure 11:
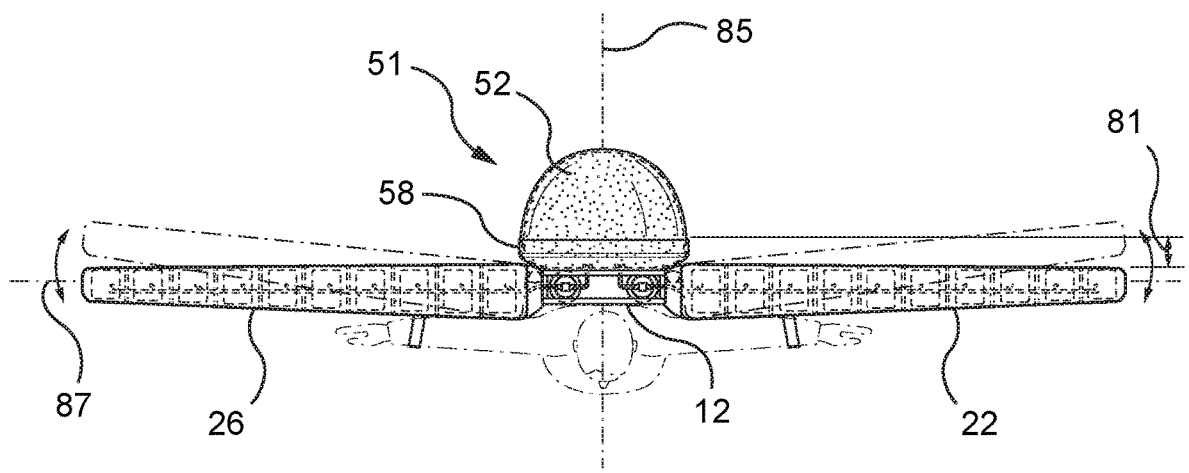
FIG. 11 is a front elevation view of the inflatable flight vehicle of FIG. 1, inflated.

Referring to FIGS. 9 to 11, in the illustrated example a pilot user 89 may control the position of wings 22, 26 to guide the motion of flight vehicle 10. In the illustrated example, a pilot user 89 strapped to the vehicle 10 by harness 18 may have a left arm strapped to port wing 22 and a right arm strapped to starboard wing 26. Wings 22 and 26 may be biased into a desired position, such as by a system of extension springs or compression springs. For example, a user may choose a flight position as the biased position of wings 22, 26, with the flight position having wings 22, 26 generally in a plane defined by longitudinal axis 83 and transverse axis 87, and with wings 22, 26 extending out from frame 12 perpendicular to longitudinal axis 83, as shown in FIG. 9.

In some embodiments, port and starboard ball joints 46, 48 allow a pilot user 89 to rotate port and starboard wings 22, 26 longitudinally as shown in FIG. 10 by applying a force through the arms of the pilot user 89. Longitudinal movement may be limited within predetermined operational limits. As shown in FIG. 11, pilot user 89 may also be able to rotate port and starboard wings 22, 26 vertically. Vertical movement may also be limited within predetermined operational limits, and in the illustrated example vertical movement below the transverse axis 87 of frame 12 is not available.

Referring to FIG. 9, rigid base member 58 has a length 77 parallel to the longitudinal axis 83 and a width 79 parallel to the transverse axis 87. Referring to FIG. 11, rigid base member 58 also has a height 81 parallel to the vertical axis 85. In the illustrated example, the height 81 is smaller than the width 79, and the width 79 is smaller than the length 77.

Figure 12:
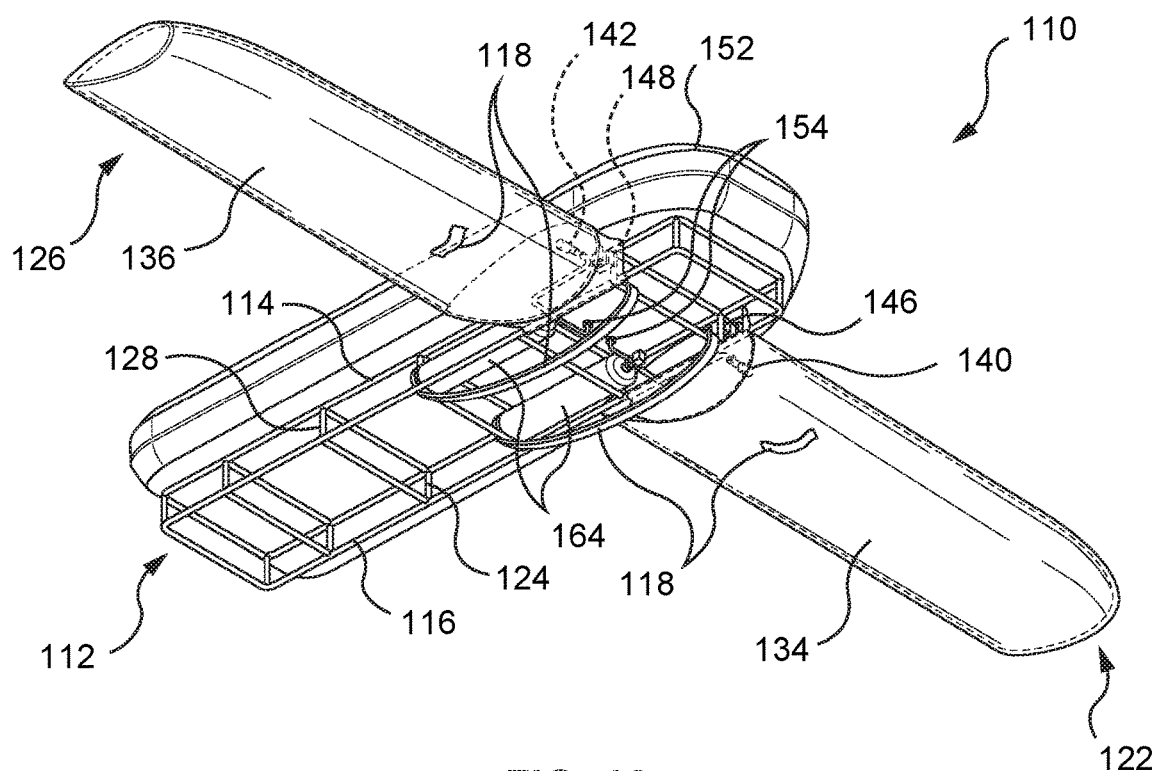
FIG. 12 is a bottom front perspective view of an inflatable flight vehicle according to a second embodiment, deflated.

Referring to FIG. 12, another example of a flight vehicle 110 is illustrated. The flight vehicle 110 is similar in many respects to flight vehicle 10, and like features are identified by like reference characters, incremented by 100.

Exemplary flight vehicle 110 includes a frame 112. Frame 112 has a top side 114 and a bottom side 116, and the bottom side 116 is configured to receive a user harness. A user harness is secured to the bottom side 116 of the exemplary embodiment. In the exemplary embodiment, the user harness is a system of straps 118 to hold flight vehicle 110 to a pilot user.

Flight vehicle 110 also includes a set of wings. In the illustrated example the set of wings includes a port wing 122 extending from a port side 124 of frame 112 and a starboard wing 126 extending from a starboard side 128 of frame 12. Each wing includes at least one helium wing bag to hold a wing volume of helium. Port wing 122 forms a drop stitch bag 134 and starboard wing 126 forms a drop stitch bag 136. Drop stitch bag 134 includes a port bag opening 140 for the passage of fluid in and out, and drop stitch bag 136 includes a starboard bag opening 142 for the passage of fluid in and out.

Figure 14:
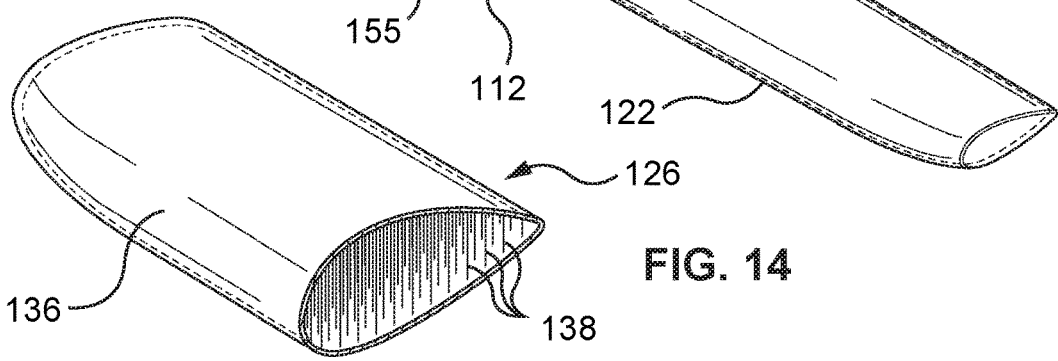
FIG. 14 is a top perspective sectional view of the inflatable flight vehicle of FIG. 12, taken along the line 14-14 of FIG. 13.

Referring to FIG. 14, a perspective cross section of starboard wing 126 is illustrated, showing drop stitch bag 136. Drop stitch bag 136 includes a plurality of drop stitch threads 138 extending between opposite walls of drop stitch bag 136 to limit the expansion of drop stitch bag 136. The inclusion of drop stitch threads 138 allows drop stitch bag 136 to take on a predetermined shape when inflated, while distributing forces across the walls of drop stitch bag 136. As depicted, the wall structure of drop stitch bag 136 is also the wall structure of starboard wing 126, although in other embodiments one or more drop stitch bags may be placed within a wing wall structure. Port wing 122 is constructed similarly to starboard wing 126.

Figure 13:
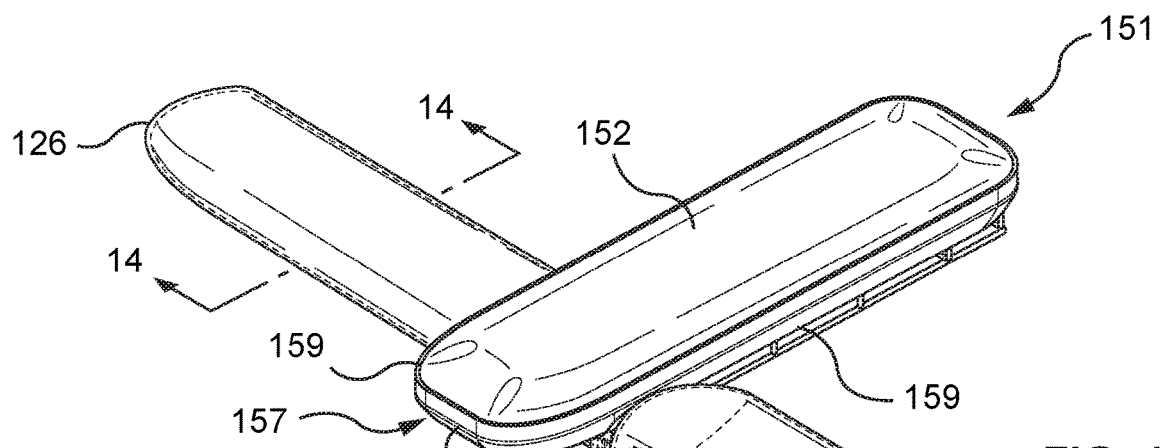
FIG. 13 is a top front perspective view of the inflatable flight vehicle of FIG. 12, deflated.

Referring to FIGS. 12 and 13, in the illustrated embodiment port joint 146 joins port wing 122 and frame 112 together and starboard joint 148 joins starboard wing 126 and frame 112 together. Port and starboard joints 146, 148 are ball joints allowing rotary motion of port and starboard wings 122, 126. However, in other embodiments wings may be joined to a frame without a joint between, such as by being rigidly secured directly to the frame.

A helium backpack 151 includes is secured to a top side 114 of frame 112. Helium backpack 151 comprises main helium bag 152 having a main bag opening 154 for the passage of fluid in and out of the main helium bag 152.

Referring to FIG. 13, in the illustrated embodiment, helium backpack 151 also comprises a rigid base member 158 which is secured to the top side of the frame 112. In the illustrated example, the main helium bag 152 is joined to a top surface 159 of the rigid base member 158. As illustrated, main bag opening 154 is a pair of port and starboard openings extending through rigid base member 158 and into an interior of main helium bag 152.

In the illustrated embodiment, rigid base member 158 is a planar base member having a slightly convex upper surface 159 and an aerodynamically-shaped front face 157 forming a leading edge 155. An aerodynamically-shaped front face 157 may permit easier gliding flight when main helium bag 152 is deflated as shown in FIG. 13.

Referring again to FIG. 12, flight vehicle 110 includes a pair of pressurized containers 164 secured to the frame. The pair of pressurized containers 164 are each configured to contain liquid helium and each include an opening for the passage of fluid in and out of the pressurized container.

Figure 17:
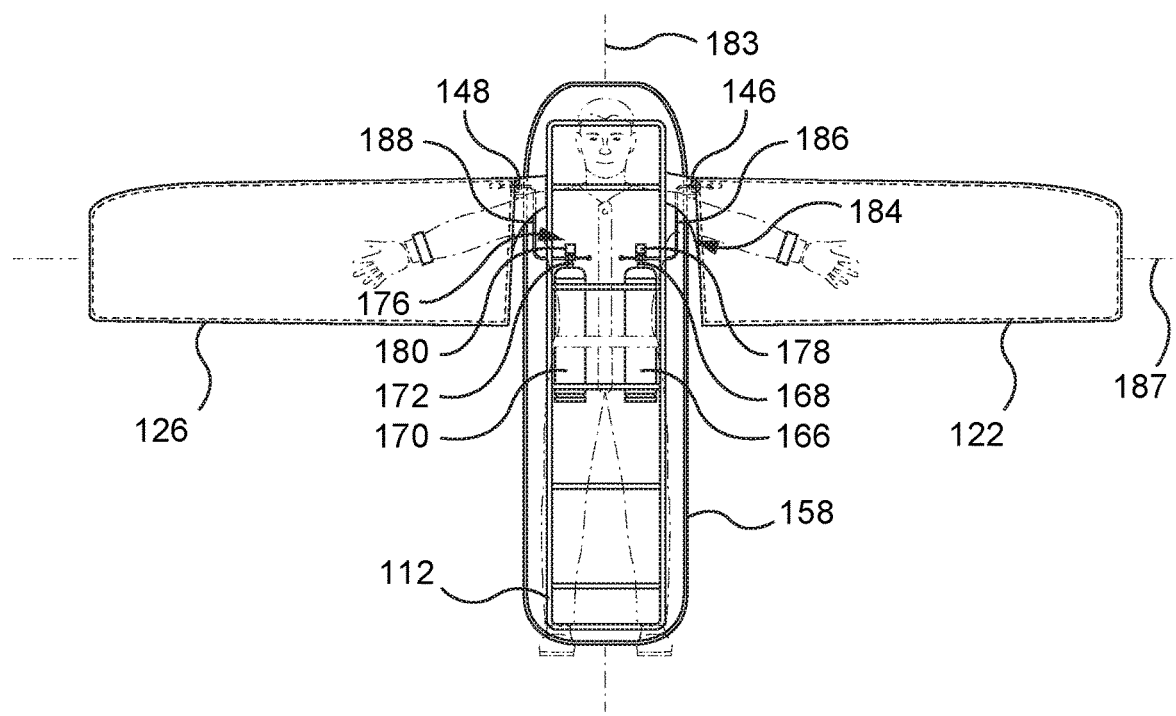
FIG. 17 is a bottom plan view of the inflatable flight vehicle of FIG. 12.

Referring to FIG. 17, in the illustrated example the pair of pressurized containers 164 includes a port container 166 having a port container opening 168 and a starboard container 170 having a starboard container opening 172. The flight vehicle 10 also includes at least one electronic valve 176. In the illustrated example the at least one electronic valve 176 includes a port valve 178 and a starboard valve 180. The port valve 178 is coupled to port container 166 for governing fluid flow through port container opening 168 while the starboard valve 180 is coupled to starboard container 170 for governing fluid flow through starboard opening 172.

Continuing to refer to FIG. 17, a system of hoses 184 connects the at least one electronic valve 176 to the main bag opening 154 (FIG. 12) and the port and starboard wing bag openings 140, 142 (FIG. 12). System of hoses 184 are shaped to carry a flow of helium, and may be thermoplastic or metal hoses for example. In the illustrated example, system of hoses 184 includes a port set of hoses 186 connecting the port container 166 to the main bag opening 154 and the port wing bag openings 140. The system of hoses 184 also includes a starboard set of hoses 188 connecting the starboard container 170 to the main bag opening 154 and the port wing bag openings 142.

Figure 15:
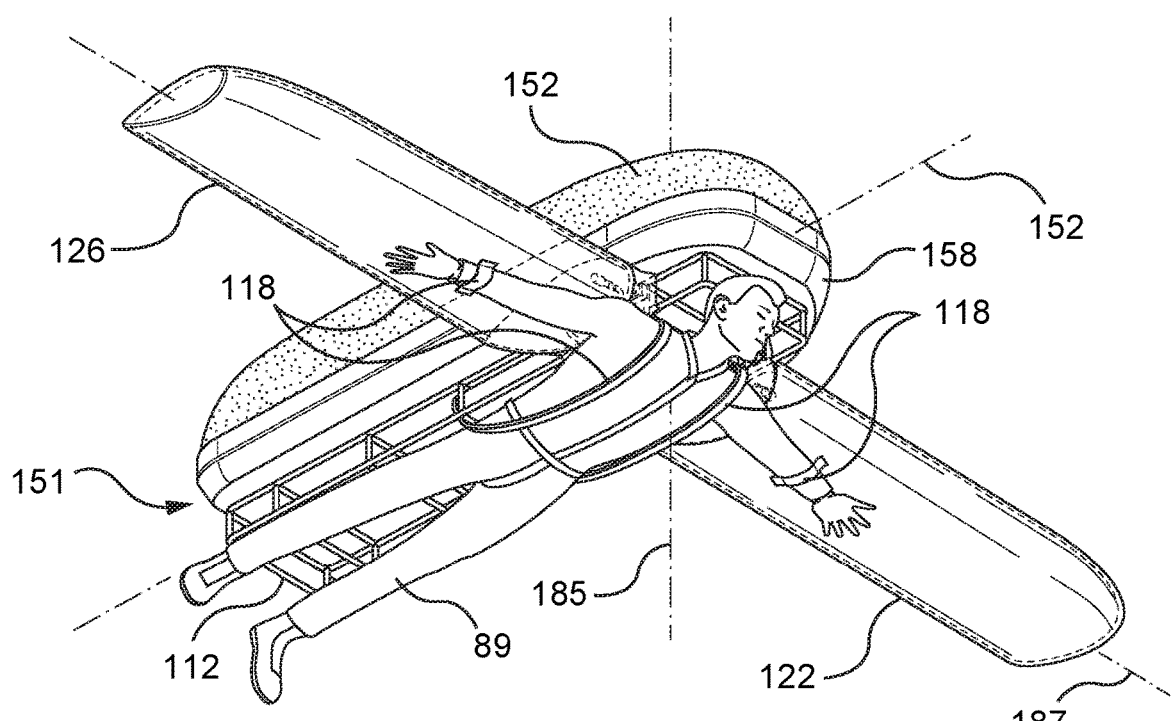
FIG. 15 is a bottom front perspective view of the inflatable flight vehicle of FIG. 12, inflated.

Referring to FIG. 15, flight vehicle 110 defines a longitudinal axis 183, a vertical axis 185 orthogonal to longitudinal axis 183, and a transverse axis 187 orthogonal to both longitudinal axis 183 and vertical axis 185. A pilot user 189 is secured to frame 112 by harness 118.

Figure 16:
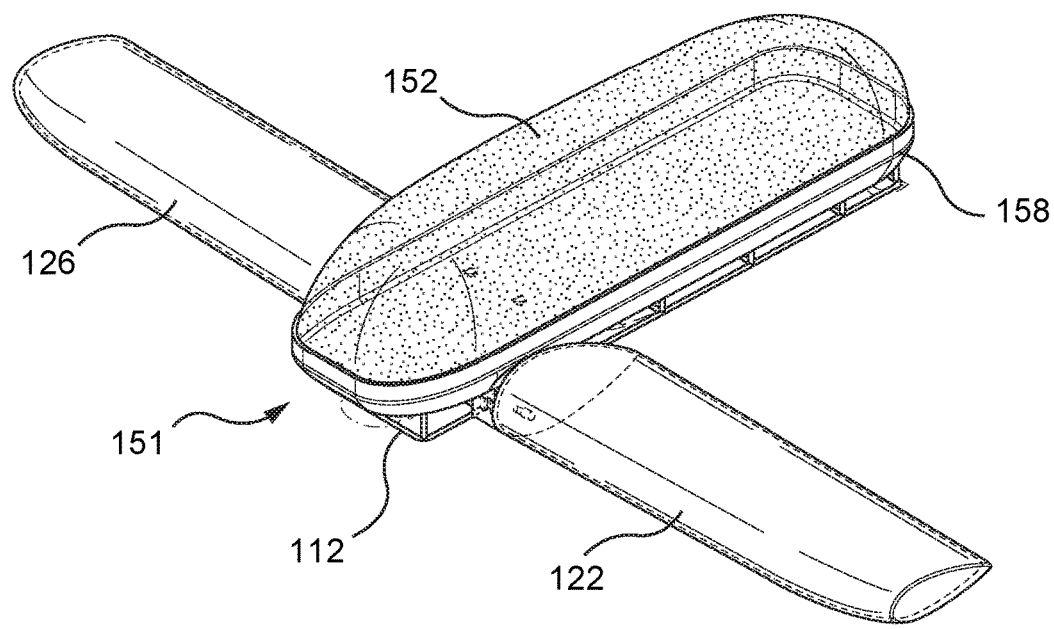
FIG. 16 is a top front perspective view of the inflatable flight vehicle of FIG. 12, inflated.

Referring to FIGS. 15 and 16, main helium bag 152 may be inflated, such as by the release by valves 176 of a flow of helium from containers 164 through hoses 184. In the illustrated example, as main helium bag 152 inflates, elastic expansion member 160 expands away from rigid base member 158 generally along vertical axis 185 to accommodate a main bag volume of helium gas within main helium bag 152.

A flow of helium may be released by valves 176 to main helium bag 152 and to port and starboard wing bags 134, 136 to inflate all helium bags together. Alternatively, valves 176 may release helium gas to only a subset of the helium bags. For example, wing bags 134, 136 may be kept inflated while only main helium bag 152 is inflated and deflated. Deflation of one or more helium bags may also be controlled by valves 176.

Valves 176 may have a number of operational settings. Operational settings may include a closed position, in which a helium flow through hoses 184 both to and from one or more inflatable bag is blocked. Operational settings may also include an inflation open position in which hoses 184 are opened between the pressurized containers 164 and at least one inflatable bag to increase the volume of helium gas in the at least one inflatable bag. Operational settings may also include a deflation open position, in which a passage is opened between at least one inflatable bag and the environment to vent the helium gas from the at least one inflatable bag.

Operational settings may be selected on a bag-by-bag basis. For example, a user may choose to inflate main inflatable bag 152 while leaving port and starboard wing bags 134, 136 at a current inflation level. As another example, a user may choose to inflate port and starboard bags 134, 136 while deflating main inflatable bag 152, such as to maintain a lifting force while deflating expansion member 160 against rigid base member 158 to facilitate gliding flight.

In some embodiments, a flight vehicle includes a control system, such as a control system similar to control system 90 of FIG. 8. A control system may receive input from a user through an input device and may display information to the user through a display. A user may access the control system remotely, however where a user is a pilot user 189 held to flight vehicle 110 by harness 118 the input device and display may include a display screen mounted on a helmet or adjacent a head of the pilot user 189 while the input device may be a plurality of buttons located on a glove or adjacent a hand of the pilot user 189.

An input device of a control system may receive flight directions from a user and transmit the flight directions to a processor. The processor may include more than one processor in some embodiments. The processor may provide flight control instructions to a flight control unit. The flight control unit may include a valve control unit controlling the operational setting of valves 176. In embodiments in which flight vehicle 110 is a powered vehicle, such as incorporating a motor and fan (not shown), the flight control unit may also include a fan control unit and/or rudder control unit or similar powered flight control units.

A control system may also include pressure sensors to detect and provide sensed pressure measurements. The pressure sensors may include a sensor coupled to the main helium bag 152 to detect a main helium pressure of the main helium bag 152 and a sensor coupled to the port and starboard helium bags 134, 136 to detect a wing helium pressure of the port and starboard helium bags 134, 136. The pressure sensors may provide sensed main helium pressure and wing helium pressure results to the processor.

In some embodiments, a user controls valves 176 by setting a desired pressure measurement of one or more of the helium bags 152, 134, 136. The control system may then select the operating position of valves 176 by comparing the sensed pressure measurement to the predetermined pressure measurement received from the user as a desired pressure measurement.

A control system may also allow a user to control the pressure of the main helium bag 152 separately from the pressure of the helium wing bags 134, 136. For example the user may choose to inflate all helium bags to lift the flight vehicle 110 into the air, and may then choose to deflate the main helium bag 152 to provide a more aerodynamic shape of flight vehicle 110 for gliding or powered flight while maintaining some lifting force due to the helium in the wings 122, 126.

Figure 18:
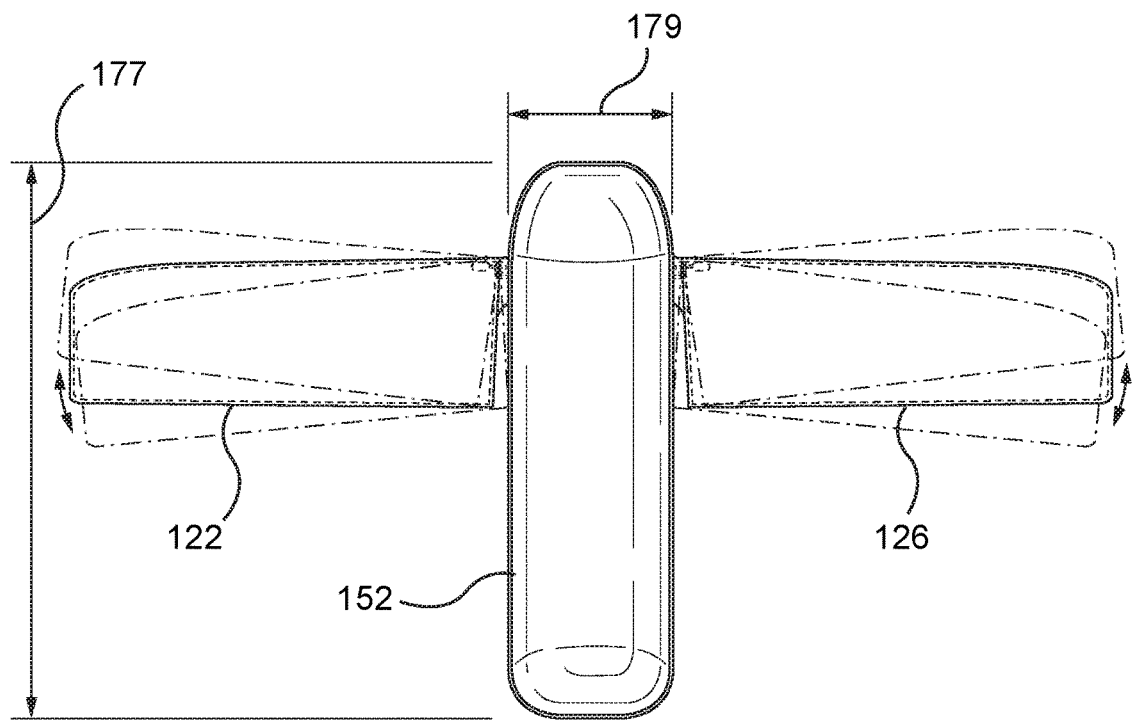
FIG. 18 is a top plan view of the inflatable flight vehicle of FIG. 12, deflated.
Figure 19:
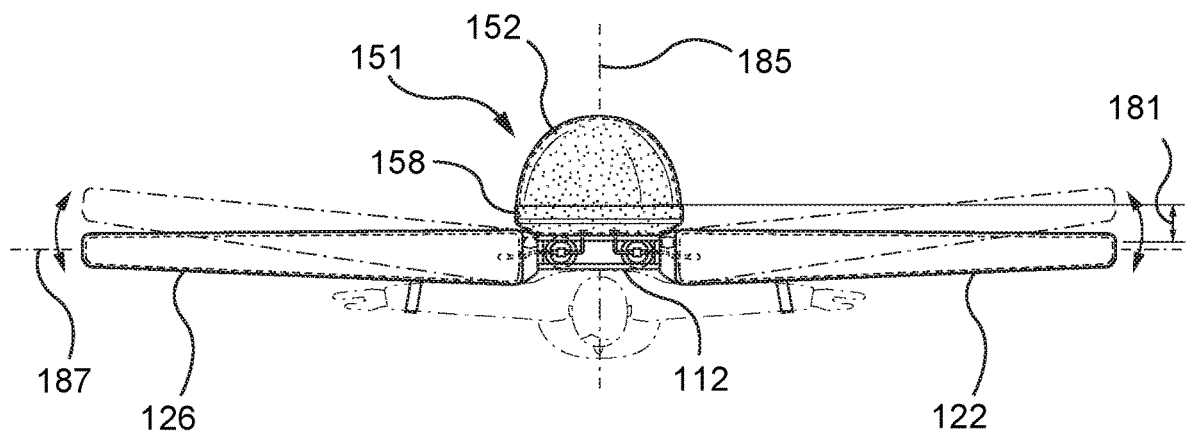
FIG. 19 is a front elevation view of the inflatable flight vehicle of FIG. 12, inflated.

Referring to FIGS. 17 to 19, in the illustrated example a pilot user 189 may control the position of wings 122, 126 to guide the motion of flight vehicle 110. In the illustrated example, flight vehicle 110 is non-powered and a pilot user 189 strapped to the vehicle 110 by harness 118 may have a left arm strapped to port wing 122 and a right arm strapped to starboard wing 126. Wings 122 and 126 may be biased into a desired position, such as by a system of extension springs or compression springs. For example, a user may choose a flight position as the biased position of wings 122, 126, with the flight position having wings 122, 126 generally in a plane defined by longitudinal axis 183 and transverse axis 187, and with wings 122, 126 extending out from frame 112 perpendicular to longitudinal axis 183, as shown in FIG. 17.

In some embodiments, port and starboard ball joints 146, 148 allow a pilot user 189 to rotate port and starboard wings 122, 126 longitudinally as shown in FIG. 18. Longitudinal movement may be limited within predetermined operational limits. As shown in FIG. 19, pilot user 189 may also be able to rotate port and starboard wings 122, 126 vertically. Vertical movement may also be limited within predetermined operational limits, and in the illustrated example vertical movement below the transverse axis 187 of frame 112 is not available.

Referring to FIG. 18, rigid base member 158 has a length 177 parallel to the longitudinal axis 183 and a width 179 parallel to the transverse axis 187. Referring to FIG. 19, rigid base member 158 also has a height 181 parallel to the vertical axis 185. In the illustrated example, the height 181 is smaller than the width 179, and the width 179 is smaller than the length 177.

Figure 20:
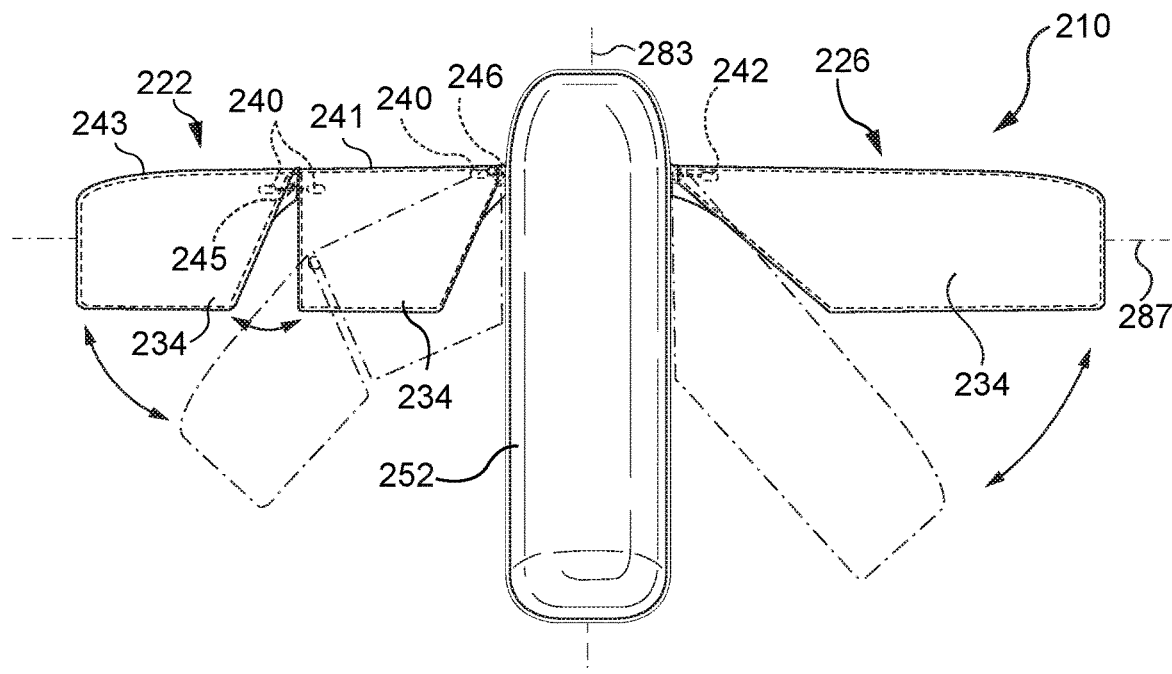
FIG. 20 is a top plan view of an inflatable flight vehicle according to a third embodiment, deflated.

Referring to FIG. 20, another example of a flight vehicle 210 is illustrated. The flight vehicle 210 is similar in many respects to flight vehicle 10, and like features are identified by like reference characters, incremented by 200.

Flight vehicle 210 has a longitudinal axis 283, a transverse axis 287 orthogonal to the longitudinal axis 283, and a vertical axis (not shown) orthogonal to both the longitudinal axis 283 and the transverse axis 287. Flight vehicle 210 has port and starboard wings 222, 226. Port and starboard wings 222, 226 are each shaped to permit substantial rearward longitudinal movement. In the illustrated example, each wing may be rotated rearward up to approximately 60 degrees.

Port wing 222 extends from a port side of vehicle 210 and starboard wing 226 extends from a starboard side of vehicle 210. Port wing 222 in the illustrated example is a two-part wing, each part forming a drop-stitch bag 234. First part 241 is joined at joint 246 to a frame (not shown) of the vehicle 210. Second part 243 is joined at joint 245 to first part 241. Each of joints 246, 245 is covered by a flexible membrane cover.

In the illustrated embodiment, joints 246, 245 are ball joints and first and second portions 243, 245 are biased into flight positions by spring systems (not shown). Joints 246, 245 allow a pilot user (not shown), having a portion of an arm joined to first part 241 and a portion of the arm joined to second part 243, to rotate the first and second parts 241, 243 longitudinally. For example, a forearm could be joined to first part 241 and a hand joined to second part 243. Longitudinal movement may be limited within predetermined operational limits. A pilot user may also be able to rotate first and second portions 241, 243 vertically. Vertical movement may also be limited within predetermined operational limits, and in the illustrated example vertical movement below the transverse axis 287 is not available.

Port bag openings 240 are provided for the passage of fluid in and out of port wing 222. Starboard wing 226 in the illustrated example is a one-part wing forming a drop-stich bag 234. Starboard bag opening 242 is provided for the passage of fluid in and out of starboard wing 226.

Figure 21:
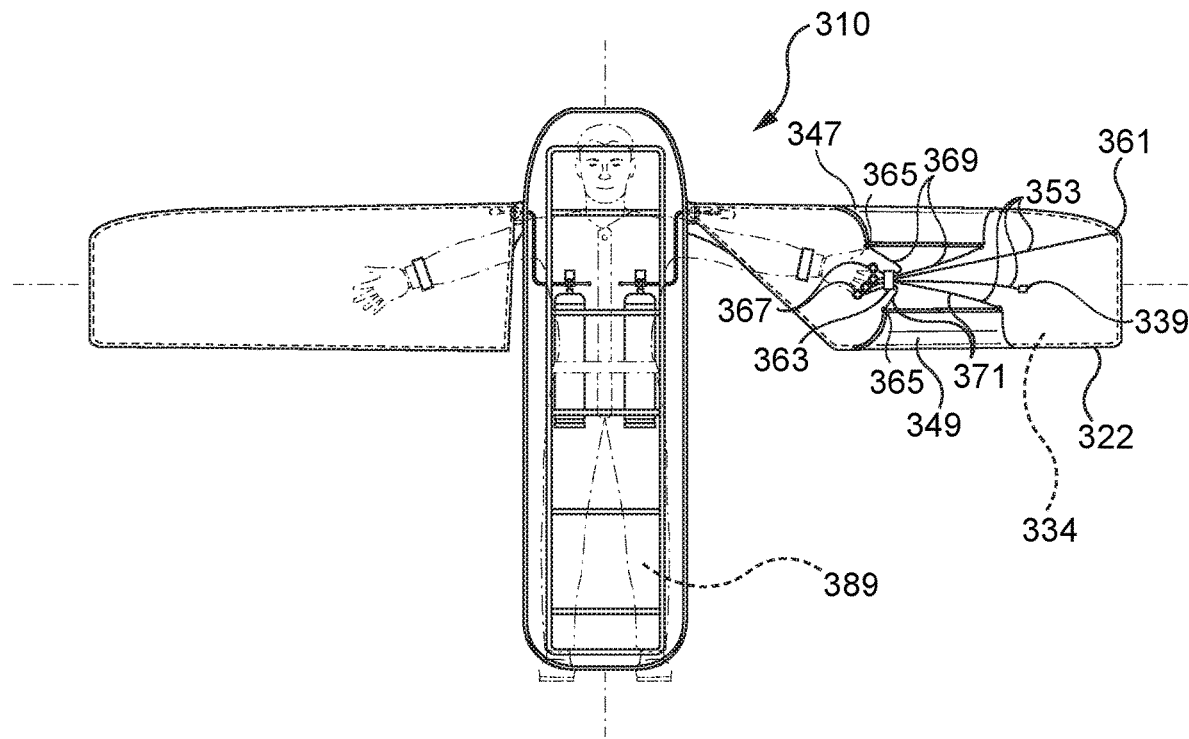
FIG. 21 is a bottom plan view of an inflatable flight vehicle according to a fourth embodiment.

Referring to FIG. 21, another example of a flight vehicle 310 is illustrated. The flight vehicle 310 is similar in many respects to flight vehicle 10, and like features are identified by like reference characters, incremented by 300.

Flight vehicle 310 has a port wing 322. Port wing 322 is configured to allow a pilot user 389 to move and flex the wing and have fine control of the flying surfaces of the wing to allow more subtle flight maneuvers.

In the illustrated example, a system of cables 353 allows the user to adjust various parts of wing 322. The system of cables 353 includes a number of cables each running from a hub point 363 to anchor points 365. The cables of the system of cables 353 may be drawn on by a user 389 by pulling on rings 367 joined to the hub point 363. Each ring 367 controls a cable or group of cables of the system of cables 353.

The illustrated wing 322 includes a forward flap 347 and a rear flap 349. Each of flaps 347, 359 may be controlled by a separate group of cables 369, 371 of the system of cables 353. Flaps 347, 349 may be biased in a rest position, such as a flight position, and cables 353 may allow a pilot user to move the flaps 347, 349 from a biased rest position to an actuated position to slow, steer, or otherwise maneuver flight vehicle 310.

For example, flap 347 may be a rigid or semi-rigid flap, and may be secured along one end to a leading edge of wing 322. An end of flap 347 that is opposite the end secured to the leading edge of wing 322 may be held in a raised position by a leaf spring positioned between the flap 347 and an underside of wing 322 to bias the flap 347 in the raised position. A user may then draw upon a ring 367 to draw in each of the cables of the group of cables 369 connected to flap 347 to change the position of the flap 347. In some embodiments, a user may alternatively or additionally draw upon a cable of the system of cables 353 to directly compress a biasing spring.

System of cables 353 also includes a line joining a hand of pilot user 389 to an anchor point on a surface of wing 322 to adjust the shape of wing 322. For example, anchor point 361 of anchor points 365 is at a distal end of wing 322 to allow the user to adjust the shape of the wing 322 adjacent the anchor point 361, such as by pulling the line to cause the distal end of wing 322 to dip downwards.

While flaps and cables are shown in the illustrated embodiment, in other embodiments other combinations of additional joints between wing segments, flaps or other surface features, and flexible portions of wing may be included to allow fine control of the flying surfaces of the wing.

In some embodiments, one or more inflatable bag or envelope may have a release valve to release an internal fluid, such as release valve 339 shown in FIG. 21 and described further below. An internal fluid may be a gas or a liquid. For example, a bag such as one of the port bags 34 of FIG. 1 or drop stitch bag 136 of FIG. 12 may have a release valve governing a release passage between an interior of the bag and an ambient environment of the flight vehicle to permit the bag to vent to the ambient environment. In some embodiments, each inflatable bag or interconnected set of inflatable bags on a flight vehicle has at least one release valve.

Referring again to FIG. 21, an example of a release valve 339 is illustrated. Release valve 339 is provided on wing 322 of flight vehicle 310 to release helium from a drop stitch bag 334 within wing 322 when the release valve 339 is opened.

A release valve may open in response to one or more of a variety of events, as discussed further below.

In some embodiments, a release valve is a pressure release valve, such as provided for high-altitude flight. A pressure release valve may be used, for example, where a volume of helium in a bag may expand as the bag's altitude relative to sea level increases. A pressure release valve may be set to open once a pressure on an inner side of the valve reaches a pre-set threshold, to release the pressure on the inner side of the valve to an outer side of the valve.

A release valve may be provided to keep the flight vehicle from going beyond a threshold altitude, and may open in response to a directly detected altitude above sea level or in response to a detected minimum density of an ambient environment.

In some embodiments, a release valve is set to deflate one or more inflatable bag or envelope slowly after a predetermined time so that a flight vehicle that is aloft will descend. For example, if a pilot loses consciousness or otherwise loses control of a flight vehicle, a predetermined slow deflation may return the pilot to a ground level. For example, a flight vehicle may include a timer or other automated system that counts down from a set point time and actuates the opening of a release valve once a predetermined time has elapsed. The set point time may be, for example, an initiation of initial inflation. The set point may also be, or may be reset by, events such as receiving a new instruction from a pilot user, detecting a change in pressure in the inflatable bag due to a pilot user action (i.e. other than a gradual change in pressure such as caused by leakage or ascent), or detecting a release of helium from a pressurized supply container. The release valve opened after the predetermined time may be the same valve as a pressure release valve or altitude release valve, or may be a separate release valve. In some embodiments, an automated system-initiated decent may be guided by an automated flying system that uses GPS, mapping data, and/or radar, LIDAR, or other distance sensors to guide the flight vehicle to a controlled landing. An automated flying system may be or include a control system such as control system 90 of FIG. 8 in some embodiments, and may be fully automated or partially automated and may permit a user to choose between one or more automated control modes and manual control.

In some embodiments, one or more inflatable bag or envelope may have a manual release valve, such as a manual emergency release valve. A manual release valve may be manually accessible to a pilot user when the pilot user is received in a user harness. For example, a control wire may run from a manual release valve to a position adjacent a hand of the pilot user and the pilot user may be able to open the manual release valve by drawing on the control wire. The manual release valve may be a spring-loaded valve or otherwise biased to a closed position and held open only as long as the pilot user has the control wire drawn back, so that the pilot user is able to close the manual release valve by releasing the control wire.

Referring again to FIG. 21, release valve 339 may be a spring-loaded release valve that can be opened, such as by a user 389 drawing on a cable 353, but is biased to a closed position.

A release valve may also or alternatively be provided on the main helium bag, such as main helium bag 52 of FIG. 2.

Figure 22:
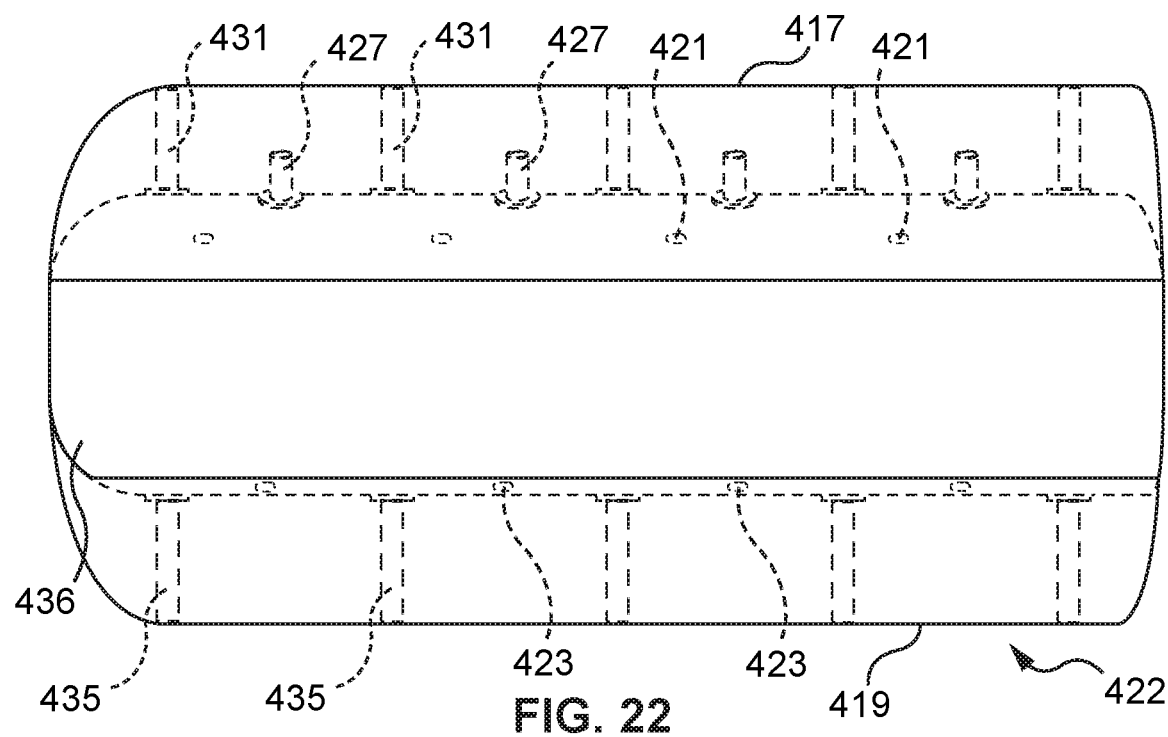
FIG. 22 is a top plan view of a wing according to an embodiment.
Figure 23:
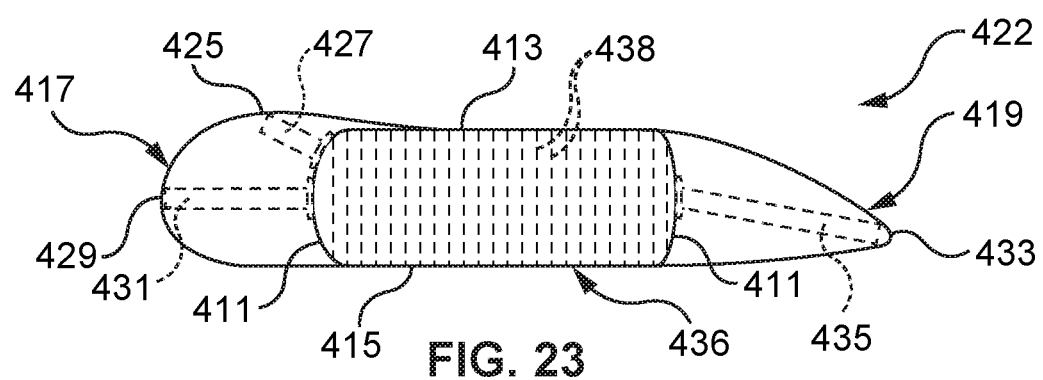
FIG. 23 is a right side elevation view of the wing of FIG. 22.
Figure 24:
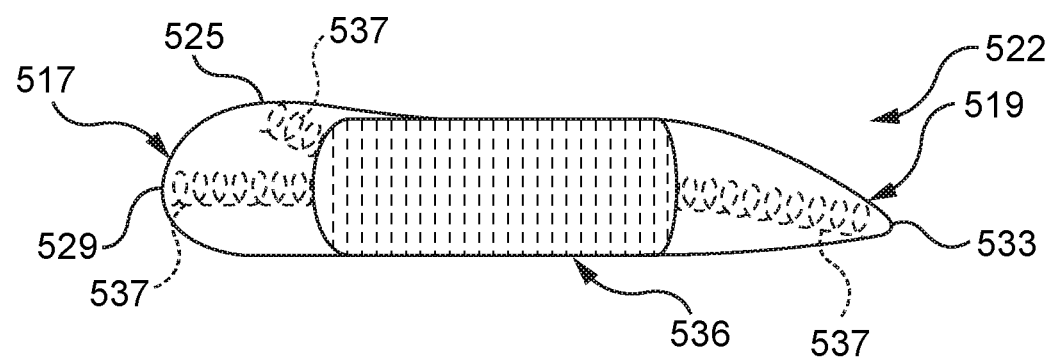
FIG. 24 is a right side elevation view of a wing according to an embodiment.

Referring to FIGS. 22 to 24, illustrated are embodiments of wings 422 and 522 comprising drop stitch bags with edge extensions. In some embodiments, a wing may be modified by way of one or more edge extension to improve the aerodynamic shape of the wing, such as to give the wing an airfoil cross-sectional shape. For example, a drop stitch bag may have upper and lower layers that are generally parallel and opposite one another when the drop stitch bag is inflated with sidewalls extending between the upper and lower layers, and a leading edge extension and optional trailing edge extension may be added to the drop stitch bag to give the wing an airfoil cross-sectional shape.

Referring to FIGS. 22 and 23, wing 422 is similar in many respects to wing 122 and like features are identified by like reference characters incremented by 300. Wing 422 includes a drop stitch bag 436 formed with a plurality of drop stitch threads 438. Drop stitch bag 436 is a generally rectangular bag having sidewalls 411 extending between top wall 413 and bottom wall 415. Top wall 413 and bottom wall 415 are generally parallel and opposite one another. Sidewalls 411 may be outwardly bowed when drop stitch bag 436 is inflated (FIG. 23) but drop stitch bag 436 does not have an airfoil cross-sectional shape.

Wing 422 also includes a leading edge extension 417 and a trailing edge extension 419. Each of leading and trailing edge extensions 417 and 419 contributes to giving wing 422 an airfoil cross-sectional shape. Although wing 422 is shown with both leading edge extension 417 and trailing edge extension 419, some wings may use only one edge extension and/or only a partial edge extension. Edge extensions 417 and 419 are shown without drop stitch threads, however in some embodiments one or more edge extension may include drop stitch construction.

In the illustrated example, leading edge extension 417 forms an inflatable chamber that is in fluid communication with drop stitch bag 436 through ports 421. Similarly, trailing edge extension 419 forms an inflatable chamber that is in fluid communication with drop stitch bag 436 through ports 423. Each extension may be inflated and deflated as drop stitch bag 436 is inflated or deflated. Ports 421 and 423 may have filters, such as to prevent movement of debris in or out of drop stitch bag 436. Ports 421 and 423 may also or alternatively be governed by a material that obstructs a flow of helium so as to prevent rapid movement of helium between the drop stitch bag 436 and the edge extensions 417, 419.

Each of leading and trailing edge extensions include one or more supports to give the extension a desired shape. Supports are provided to give enough structure to an inflated leading or trailing edge extension to provide the wing with an aerodynamic cross sectional shape, but may be collapsible, semi-rigid, and/or flexible to allow the flight vehicle to be more easily stored or transported when deflated. For example, supports may be provided to adjust the shape of a set of outer walls of an edge extension when the edge extension is inflated to a pressure of between 10 and 30 pounds per square inch.

Each edge extension of wing 422 has a plurality of mechanical supports inside an interior of the extension. Leading edge extension 417 has a convex top surface 425 supported by a first set of collapsible rods 427. A modified leading edge 429 of leading edge extension 417 is supported by a second set of collapsible rods 431. Similarly, trailing edge extension 419 has a modified trailing edge 433 supported by a third set of collapsible rods 435. Collapsible rods 427, 431, 435 may be formed of a durable and flexible rubber or rubberized plastic, for example, and are in turn supported by drop stitch bag 436.

While wing 422 is shown with three distinct chambers, in some embodiments one or more of the drop stitch bag, leading edge extension, and trailing edge extension may be formed of two or more chambers adjacent one another. Wing 422 may also include one or more additional wall, such as a wing envelope encompassing two or more of leading edge extension 417, trailing edge extension 419, and drop stitch bag 436. While the chambers of the edge extensions 417 and 419 of wing 422 are partially formed by wall portions of drop stitch bag 436, in some embodiments one or both edge extensions may be encompassed by a complete envelope separate from any wall of drop stitch bag 436.

Referring to FIG. 24, wing 522 is similar in many respects to wing 422, and like features are identified by like reference characters incremented by 100. Wing 522 also includes a drop stitch bag 536, a leading edge extension 517, and a trailing edge extension 519. However supports for a convex top surface 525, a modified leading edge 529, and a modified trailing edge 533 are compression springs 537. Compression springs 537 may be formed of a resilient material.

The present invention is also directed to a helium backpack for use with flight vehicles, which may be used not only with the flight vehicle described herein, but also with existing aircraft such as drones or other unmanned aircraft. In some embodiments, the helium backpack comprises a rigid base member that can be secured to the top of the drone or other aircraft, and a main helium bag that may be inflated to provide a lifting force to lift a drone or other aircraft, and then the main helium bag may be deflated to allow the drone or other aircraft to return to regular operations. In some embodiments for use with drones, all sides of the rigid base member may be aerodynamically shaped to allow longitudinal and transverse movement. For example, a rigid base member may be circular or oval in shape with aerodynamic forward, backward, and side edges each forming a leading edge.

For example, the helium backpack may be for use with a flight vehicle having a set of port and starboard wings each secured directly or indirectly to a rigid base member of the helium backpack, and at least one pressurized container secured directly or indirectly to the rigid base member and joined to the main helium bag through a valve to provide a controlled supply of helium to inflate and/or deflate the main helium bag.

Flight vehicles having leading or trailing edge extensions may also work well for personal use or small aircraft. For example, they may be used by drones carrying a motor, a propeller, and a fuel source, such an electric motor, a fan unit, and a battery similar to the motor and fan 82 and power supply 93 described above.

In some embodiments, gases other than helium may be used, provided those gases are buoyant in the atmosphere.

While the above description provides examples of one or more apparatus, methods, or systems, it will be appreciated that other apparatus, methods, or systems may be within the scope of the claims as interpreted by one of skill in the art.

The invention claimed is:
1. A flight vehicle, comprising:
a frame, the frame having a bottom side configured to receive a user harness;
a port wing extending from a port side of the frame and a starboard wing extending from a starboard side of the frame, each wing comprising at least one helium wing bag for containing a wing volume of helium and having a wing port for the passage of fluid in and out of the wing bag;
a helium backpack secured to a top side of the frame, the helium backpack comprising an inflatable main helium bag configured for holding a main volume of helium, the main helium bag having a main bag port for the passage of fluid in and out of the main helium bag;
at least one pressurized container secured to the frame, the at least one pressurized container being configured to contain liquid helium, and having a container opening for the passage of fluid in and out of the pressurized container;
at least one electronic valve coupled to the at least one pressurized container for governing fluid flow through the container opening; and
a system of hoses configured to carry a flow of helium, the system of hoses connecting the at least one electronic valve to the main bag port and to the wing ports, and wherein each of the at least one helium wing bag is fluidically isolated from the main helium bag.

2. The flight vehicle of claim 1, wherein each wing includes an outer skin supported by a plurality of ribs, and the at least one helium wing bag comprises a plurality of helium wing bags interspaced between the ribs.

3. The flight vehicle of claim 1, further comprising a release valve to vent at least one of the at least one helium wing bag of the port wing, the at least one helium wing bag of the starboard wing, and the inflatable main helium bag.

4. The flight vehicle of claim 3, wherein the release valve opens in response to at least one of a threshold internal pressure, a threshold flight vehicle altitude, a threshold elapsed time, and a manual user action.

5. The flight vehicle of claim 1, wherein the helium backpack comprises a rigid base member secured to the top side of the frame, wherein the inflatable main helium bag is joined to an upper surface of the rigid base member.

6. The flight vehicle of claim 5, wherein the rigid base member is a planar base member and extends over an entire lower end of the main helium bag.

7. The flight vehicle of claim 6, wherein the upper surface of the rigid base member is convex.

8. The flight vehicle of claim 7, wherein the rigid base member has an aerodynamically-shaped front face forming a leading edge.

9. The flight vehicle of claim 8, wherein the inflatable main helium bag has a longitudinal axis, a vertical axis orthogonal to the longitudinal axis, and a transverse axis orthogonal to both the longitudinal and the vertical axis, the rigid base member having a length parallel to the longitudinal axis, a height parallel to the vertical axis, and a width parallel to the transverse axis, the height smaller than the width and the width smaller than the length.

10. The flight vehicle of claim 1, wherein each wing includes an inflatable outer skin formed with a drop stitch construction, the inflatable outer skin forming the at least one helium wing bag.

11. The flight vehicle of claim 10, wherein each wing includes at least one inflatable edge extension having at least one support.

12. The flight vehicle of claim 11, wherein the at least one inflatable edge extension includes at least one of a leading edge extension and a trailing edge extension.

13. The flight vehicle of claim 11, wherein the at least one support is an internal support and extends between a first wall of the edge extension and a second wall of the edge extension to push apart the first and second walls of the edge extension.

14. The flight vehicle of claim 13, wherein the at least one support is a flexible post or a compression spring.

15. The flight vehicle of claim 1, wherein the at least one electronic valve has an operating position selected from a plurality of operational positions, the plurality of operational positions including a closed position, an inflation open position to supply an inflation flow of helium gas to the system of hoses from the at least one pressurized container, and a deflation open position to vent a deflation flow of helium gas from the system of hoses to the atmosphere.

16. The flight vehicle of claim 15, further comprising:
at least one pressure sensor to sense a pressure of at least one of the inflatable main helium bag and the helium wing bags, and
a control system coupled to the at least one pressure sensor to receive the sensed pressure measurement, the control system coupled to the at least one electronic valve to set the operating position of the at last one electronic valve, the control system configured to set the operating position by comparing the sensed pressure measurement to a predetermined pressure measurement.

17. The flight vehicle of claim 15, wherein the at least one electronic valve allows a main helium pressure of the main helium bag to be controlled separately from a wing helium pressure of the helium wing bags.

18. The flight vehicle of claim 15, wherein the port wing is joined to the frame by a port joint and the starboard wing joined to the frame by a starboard joint, and wherein the frame has a vertical axis and each of the port and starboard joints bias the wing in a flight position and limit downward vertical movement.

19. The flight vehicle of claim 18, wherein the port and starboard joints are ball joints.

20. A helium backpack for a flight vehicle, comprising:
an inflatable main helium bag for receiving a main volume of helium,
a rigid base member, wherein the inflatable main helium bag is joined to an upper surface of the rigid base member via an elastic expansion member, the elastic expansion member joined to the upper surface of the rigid base member along a perimeter of the elastic expansion member such that the main volume of helium is held between the elastic expansion member and the rigid base member, the inflatable main helium bag and the rigid base member having a main bag opening through from a lower surface of the rigid base member to an interior of the main helium bag for the passing of fluid in and out of the interior;
wherein the rigid base member is securable to the flight vehicle, the flight vehicle having a port wing and a starboard wing; and
at least one pressurized container secured to the rigid base member, each of the at least one pressurized container being configured to contain liquid helium and joined to the main bag opening through a valve to provide a controlled supply of helium to control an inflation level of the main helium bag.

21. The helium backpack of claim 20, wherein each wing of the set of wings is a rigid wing which includes at least one helium wing bag shaped to hold a wing volume of helium.

22. The helium backpack of claim 21, further comprising a user harness secured to the rigid base member for holding a pilot user to the flight vehicle.

23. The helium backpack of claim 22, wherein the rigid base member is a planar base member.

24. The helium backpack of claim 23, wherein an upper surface of the rigid base member is convex.

25. The helium backpack of claim 24, wherein the rigid base member has an aerodynamically-shaped front face forming a leading edge.

26. The helium backpack of claim 24, wherein the inflatable main helium bag has a longitudinal axis, a vertical axis orthogonal to the longitudinal axis, and a transverse axis orthogonal to both the longitudinal and the vertical axis, the rigid base member having a length parallel to the longitudinal axis, a height parallel to the vertical axis, and a width parallel to the transverse axis, the height smaller than the width and the width smaller than the length.

* * * * *